(12) United States Patent
Grisham et al.

(10) Patent No.: US 7,148,791 B2
(45) Date of Patent: *Dec. 12, 2006

(54) WIRELESS DANGER PROXIMITY WARNING SYSTEM AND METHOD

(75) Inventors: William T. Grisham, Huntsville, AL (US); Mark D. Roberts, Huntsville, AL (US)

(73) Assignee: Time Domain Corp., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/178,997

(22) Filed: Jul. 11, 2005

(65) Prior Publication Data

US 2005/0275513 A1 Dec. 15, 2005

Related U.S. Application Data

(63) Continuation-in-part of application No. 10/753,891, filed on Jan. 8, 2004, now Pat. No. 6,917,284, which is a continuation of application No. 09/960,820, filed on Sep. 21, 2001, now Pat. No. 6,759,948.

(51) Int. Cl.
*B60Q 1/00* (2006.01)
(52) U.S. Cl. ............... 340/435; 340/903; 340/904; 375/130
(58) Field of Classification Search ......... 340/435, 340/903, 904, 907, 993, 573.3, 573.4; 375/130, 375/146, 239; 342/1, 450
See application file for complete search history.

(56) References Cited

U.S. PATENT DOCUMENTS

| | | | | |
|---|---|---|---|---|
| 6,031,862 | A * | 2/2000 | Fullerton et al. | 375/146 |
| 6,300,903 | B1 * | 10/2001 | Richards et al. | 342/450 |
| 6,430,208 | B1 * | 8/2002 | Fullerton et al. | 375/130 |
| 6,469,628 | B1 * | 10/2002 | Richards et al. | 340/573.3 |
| 6,489,893 | B1 * | 12/2002 | Richards et al. | 340/573.4 |
| 6,492,906 | B1 * | 12/2002 | Richards et al. | 340/573.4 |
| 6,501,393 | B1 * | 12/2002 | Richards et al. | 340/993 |
| 6,504,483 | B1 * | 1/2003 | Richards et al. | 340/573.3 |
| 6,759,948 | B1 * | 7/2004 | Grisham et al. | 340/435 |
| 6,917,284 | B1 * | 7/2005 | Grisham et al. | 340/435 |

\* cited by examiner

*Primary Examiner*—John Tweel, Jr.
(74) *Attorney, Agent, or Firm*—William J. Tucker

(57) ABSTRACT

A danger proximity warning system and method are disclosed that utilize ultra wideband (UWB) technology to effectively warn a person when there is a potentially dangerous situation in their vicinity. In one embodiment, the danger proximity warning system includes a transmitting UWB radio coupled to a first object and a receiving impulse radio unit coupled to a second object. The transmitting impulse radio unit operates to transmit an UWB signal towards the second object when the first object is a predetermined distance away. Upon receiving the UWB signal, the receiving UWB radio makes sure a person associated with the second object is informed about the potentially dangerous situation. Several embodiments of the danger proximity warning system and method are disclosed all of which operate to warn a person when there is a potentially dangerous situation in their vicinity.

20 Claims, 27 Drawing Sheets

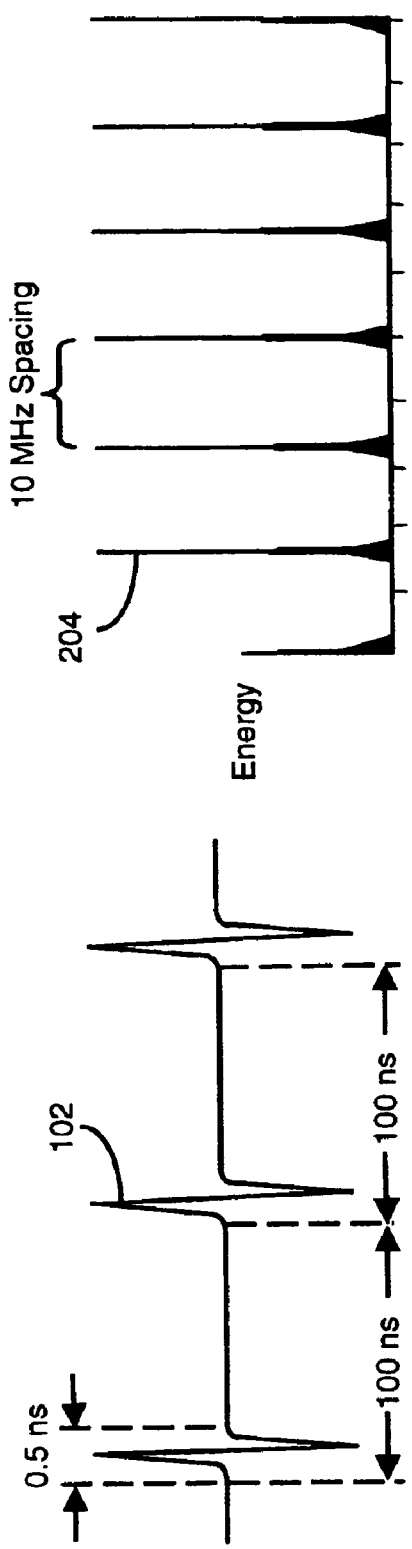
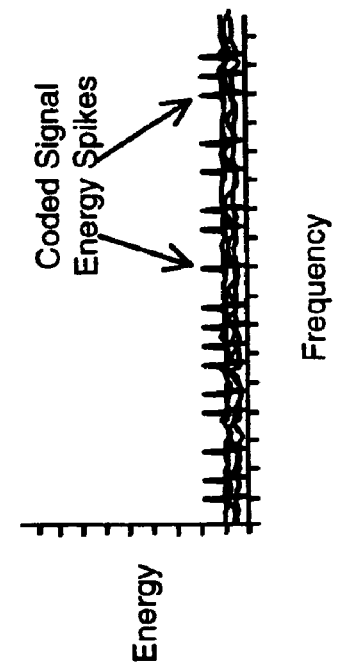
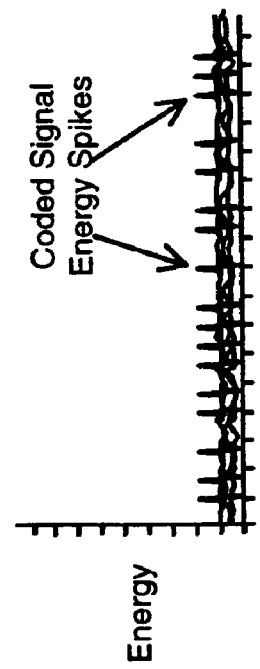
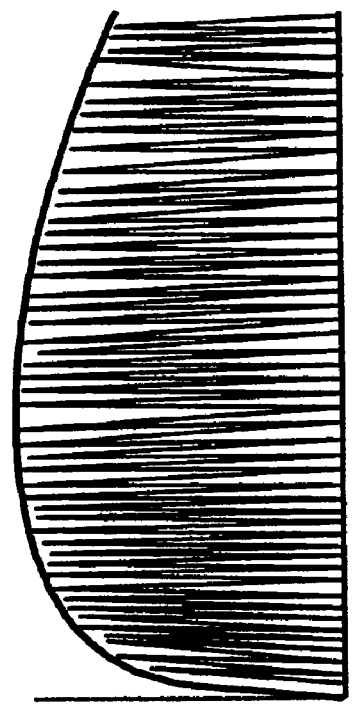

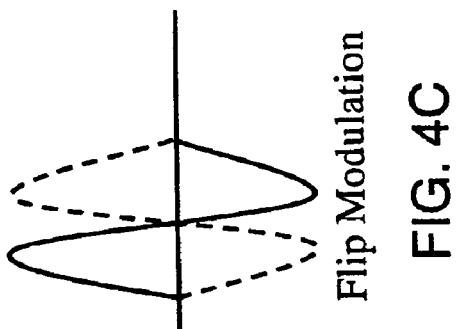
FIG. 4C Flip Modulation
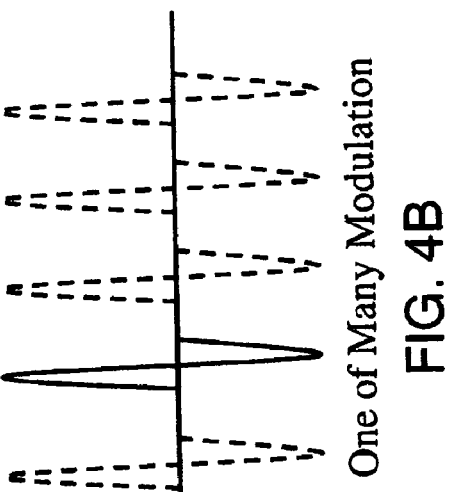
FIG. 4B One of Many Modulation
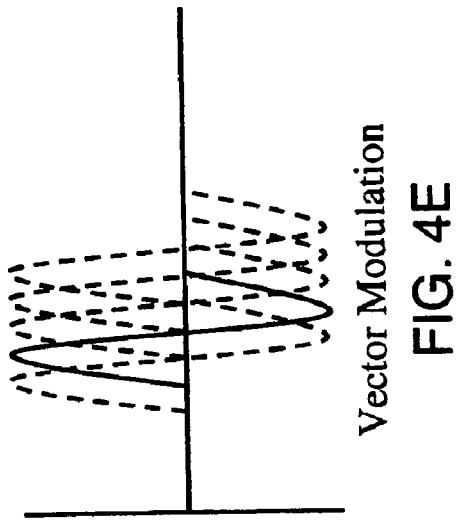
FIG. 4E Vector Modulation
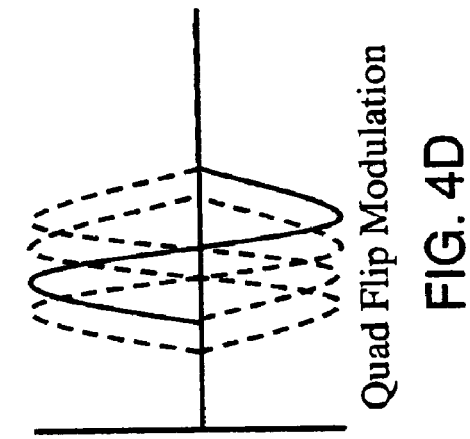
FIG. 4D Quad Flip Modulation
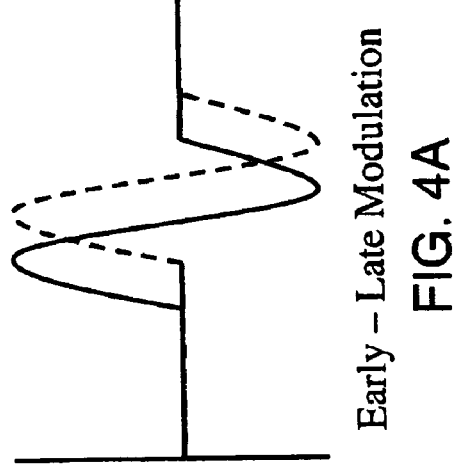
FIG. 4A Early – Late Modulation

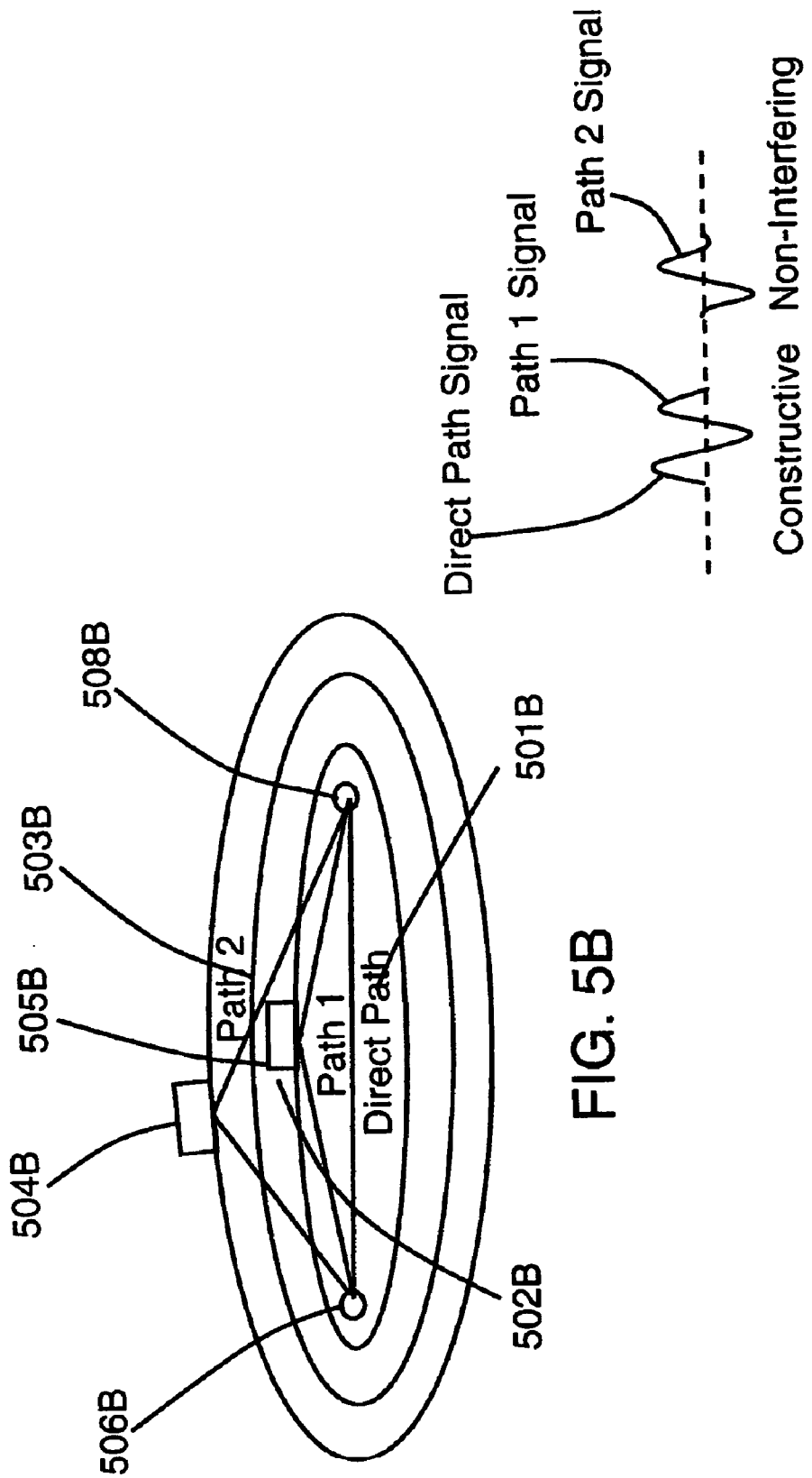

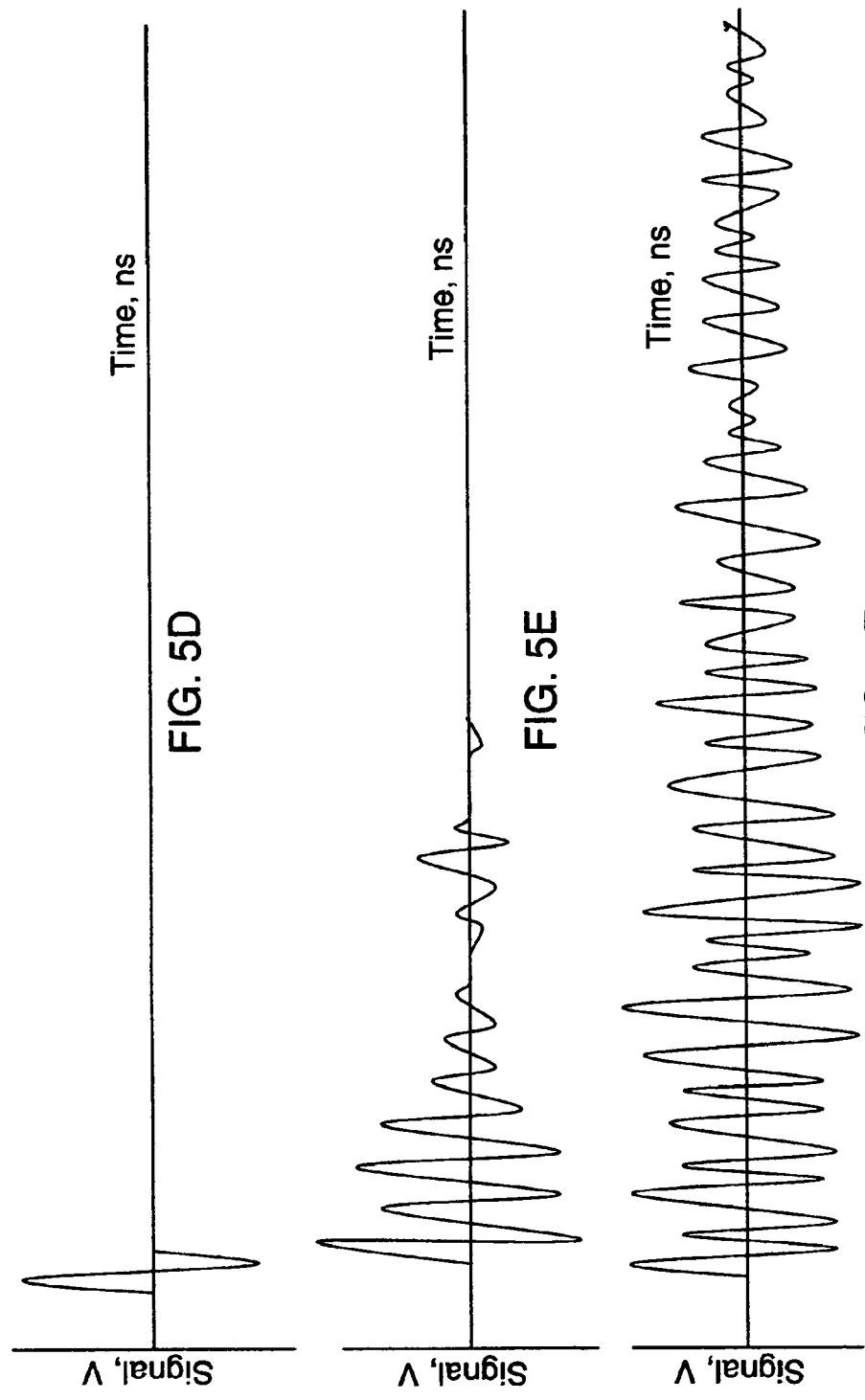

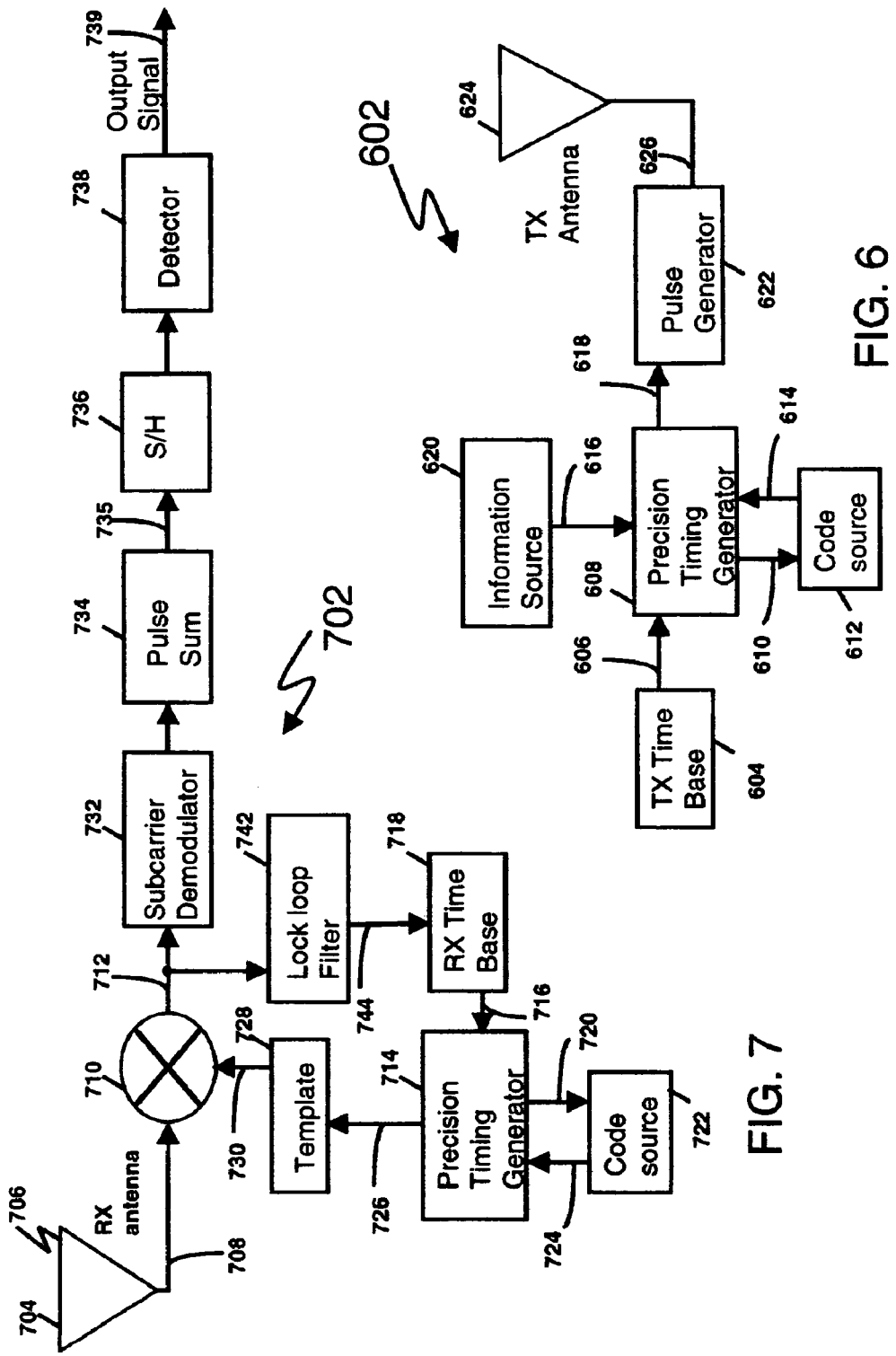

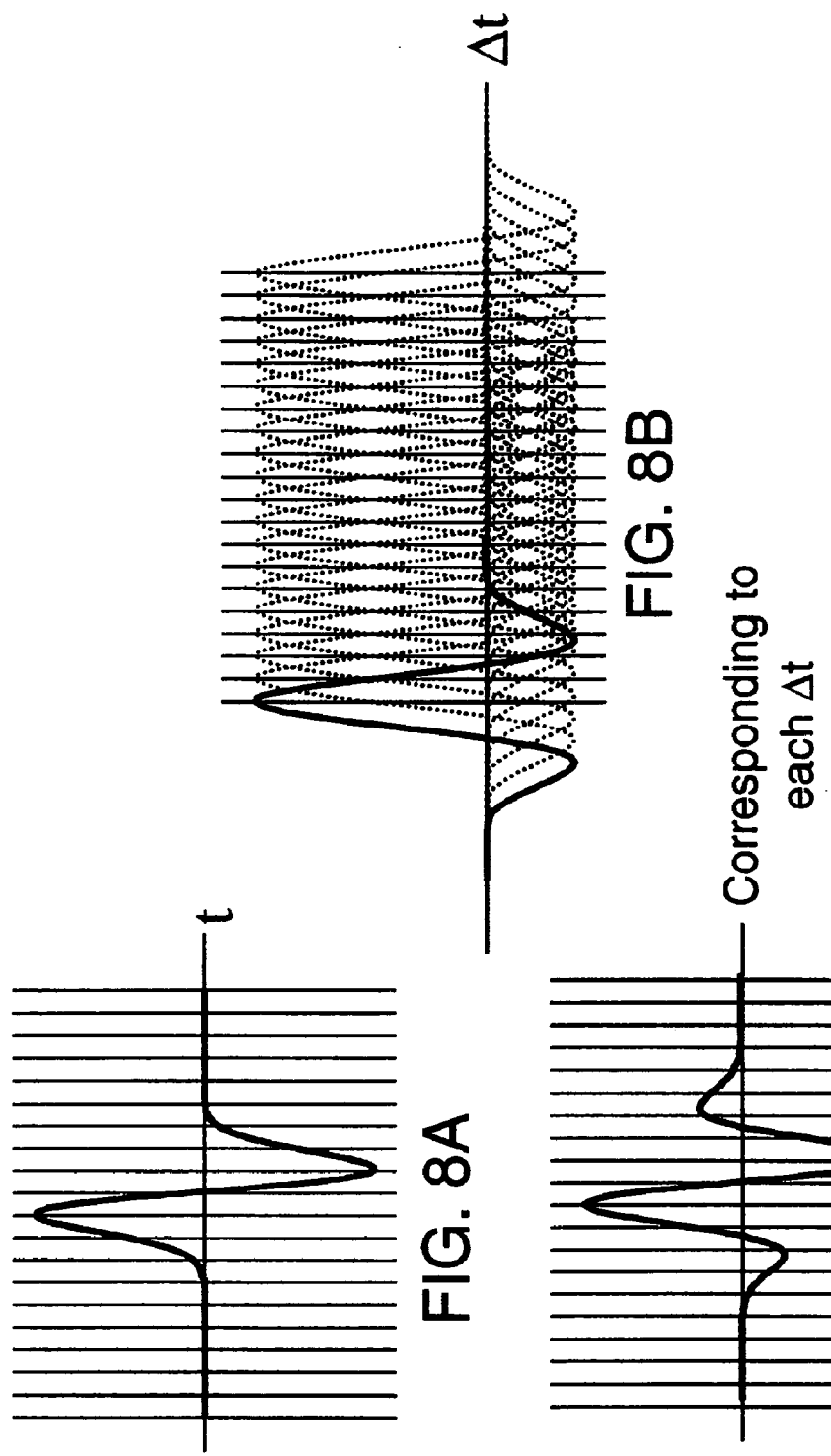

WIRELESS DANGER PROXIMITY WARNING SYSTEM AND METHOD

CROSS REFERENCE TO RELATED APPLICATION

This application is a continuation-in-part application of U.S. patent application Ser. No. 10/753,891 filed Jan. 8, 2004, now U.S. Pat. No. 6,917,284, issued Jul. 12, 2005, which is a continuation application of U.S. patent application Ser. No. 09/960,820, filed Sep. 21, 2001, now U.S. Pat. No. 6,759,948, issued Jul. 6, 2004.

BACKGROUND OF THE INVENTION

1. Field of the Invention

The present invention generally relates to the danger proximity warning field and, in particular, to a wireless danger proximity warning system and method.

2. Description of Related Art

When it comes to public safety and personal safety, it is always desirable to improve upon the way people are warned about potentially dangerous situations. For example, traditional railroad collision avoidance systems are inadequate. Presently, there are approximately 259,000 railroad crossings in the United States of which approximately 22% are active railroad crossings which means that they are protected by some sort of railroad collision avoidance system. The conventional railroad collision avoidance system uses warning lights and retractable gates to alert a motorist that there is an oncoming locomotive. This means that over 200,000 railroad crossings are passive railroad crossings, which are particularly dangerous since they have no warning lights or retractable gates to warn a motorist that a locomotive is approaching the railroad crossing. Even with the use of conventional railroad collision avoidance systems at the active railroad crossings and the lack of collision avoidance systems at passive railroad crossings there is still an unacceptable number of train-vehicle accidents. For instance, in 1999, there were 399 deaths and 1360 people seriously injured in train-vehicle accidents in the United States.

In past years, several railroad collision avoidance systems have been patented in an attempt to reduce the number of train-vehicle accidents. One such system was described in U.S. Pat. No. 4,942,395 which appears to disclose a wireless railroad grade crossing motorist warning system that warns motorists traveling within a given proximity of a railroad crossing that there is an oncoming train. The wireless railroad grade crossing motorist warning system uses a three-transceiver system, wherein the oncoming train has a mounted transceiver that communicates a warning radio signal to a transceiver located at a railroad grade crossing which, in turn, emits a coded radio signal to a transceiver unit located within a motor vehicle. Unfortunately, the wireless railroad grade crossing motorist warning system uses conventional radio communication technology and as such suffers from the traditional problems associated with that technology including, for example, interference from other radios, high power consumption and multipath interference.

Another system was described in U.S. Pat. No. 5,864,304 which appears to disclose a railroad-crossing warning system for protecting pedestrians and motorists from an oncoming train. In one embodiment, the railroad-crossing warning system has six magnetic probes that cover a 40×40 foot area in the railroad crossing that detects the presence of a stalled vehicle. If there is a stalled vehicle, the railroad-crossing warning system communicates information about the stalled vehicle to the oncoming train. In addition, the railroad-crossing warning has a series of wireless trackside devices that are equally spaced along the length of the railroad track for detecting the presence of the oncoming train at a specified location and time and for determining vital warning information about the oncoming train. The train warning information is transmitted to a two-sided light emitting (LED) display located at the railroad crossing. While this system is an improvement over many others it is still subject to interference from other transmitters and must operate within an assigned frequency that can be adversely affected by different types of interference commonly associated with traditional communication technology. Accordingly, there has been a need for a railroad collision avoidance system and method that can effectively warn a person when there is a locomotive in their vicinity. There is also a need for other types of danger proximity warning systems that can be used to warn people about a wide variety of dangerous situations like the presence of a dangerous vehicle or a person under house arrest that has left their home. These needs as well are satisified by the danger proximity warning system and method of the present invention.

BRIEF DESCRIPTION OF THE INVENTION

The present invention includes a danger proximity warning system and method that utilize impulse radio technology to effectively warn a person when there is a potentially dangerous situation, for example, when there is a locomotive in their vicinity. In one embodiment, the danger proximity warning system includes a transmitting impulse radio unit coupled to a first object (e.g., a locomotive) and a receiving impulse radio unit coupled to a second object (e.g., a vehicle). The transmitting impulse radio unit operates to transmit an impulse radio signal towards the second object when first object perceives a potentially dangerous situation. For example, the locomotive may warn a vehicle that is within a predetermined distance from a railroad crossing enabling the person operating the vehicle to be alerted to the potentially dangerous situation. Several different embodiments of the danger proximity warning system and method all of which operate to warn a person when there is a potentially dangerous situation in their vicinity are described below.

BRIEF DESCRIPTION OF THE DRAWINGS

A more complete understanding of the present invention may be had by reference to the following detailed description when taken in conjunction with the accompanying drawings wherein:

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

FIG. 4A–4E graphically illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIGS. 5D–5F illustrate a signal plot of various multipath environments.

FIG. 6 illustrates a representative impulse radio transmitter functional diagram;

FIG. 7 illustrates a representative impulse radio receiver functional diagram;

FIG. 8A illustrates a representative received pulse signal at the input to the correlator;

FIG. 8B illustrates a sequence of representative impulse signals in the correlation process;

FIG. 8C illustrates the output of the correlator for each of the time offsets of FIG. 8B.

DETAILED DESCRIPTION OF THE INVENTION

Figure 1A:
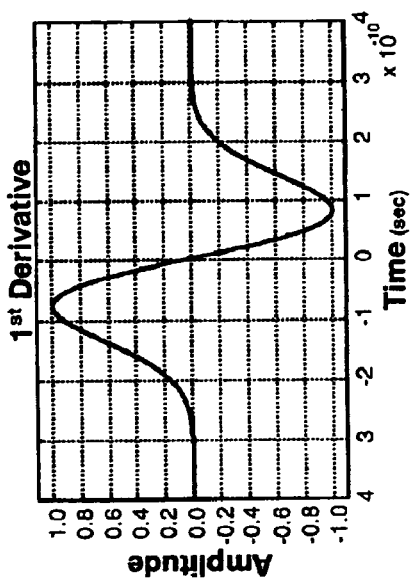
FIG. 1A illustrates a representative Gaussian Monocycle waveform in the time domain.
Figure 1B:
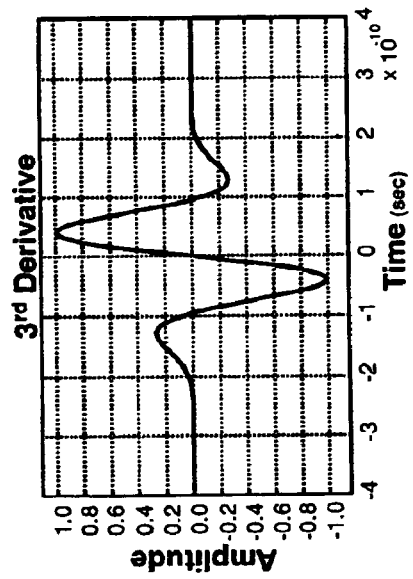
FIG. 1B illustrates the frequency domain amplitude of the Gaussian Monocycle of FIG. 1A.
Figure 1C:
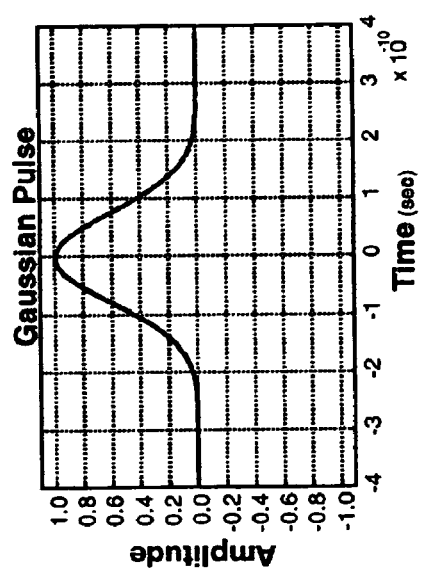
FIG. 1C represents the second derivative of the Gaussian Monocycle of FIG. 1A.
Figure 1D:
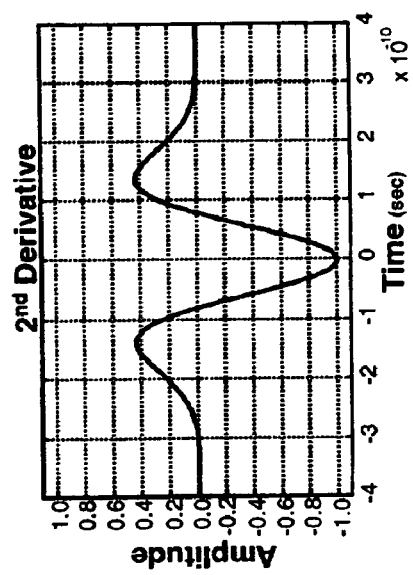
FIG. 1D represents the third derivative of the Gaussian Monocycle of FIG. 1A.

The present invention includes a railroad collision avoidance system and method that utilize impulse radio technology to effectively warn a person when there is a locomotive in their vicinity. In one embodiment, the railroad collision avoidance system includes a transmitting impulse radio unit coupled to a locomotive and a receiving impulse radio unit coupled to a vehicle. The transmitting impulse radio unit operates to transmit an impulse radio signal towards the vehicle when the locomotive is a predetermined distance from a railroad crossing. Upon receiving the impulse radio signal, the receiving impulse radio unit makes sure the person operating the vehicle is informed about the potentially dangerous situation. Several different embodiments of the railroad collision avoidance system and method all of which operate to warn a person when there is a locomotive in their vicinity are described below.

Although the present invention is described as using impulse radio technology, it should be understood that the present invention can be used with any type of ultra wideband technology, but is especially suited for use with time-modulated ultra wideband technology. Accordingly, the railroad collision avoidance system and method should not be construed in a limited manner.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. Pat. No. 6,177,903 entitled, "System and Method for Intrusion Detection using a Time Domain Radar Array" and U.S. Pat. No. 6,218,979 entitled, "Wide Area Time Domain Radar Array" both of which are assigned to the assignee of the present invention. These patents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
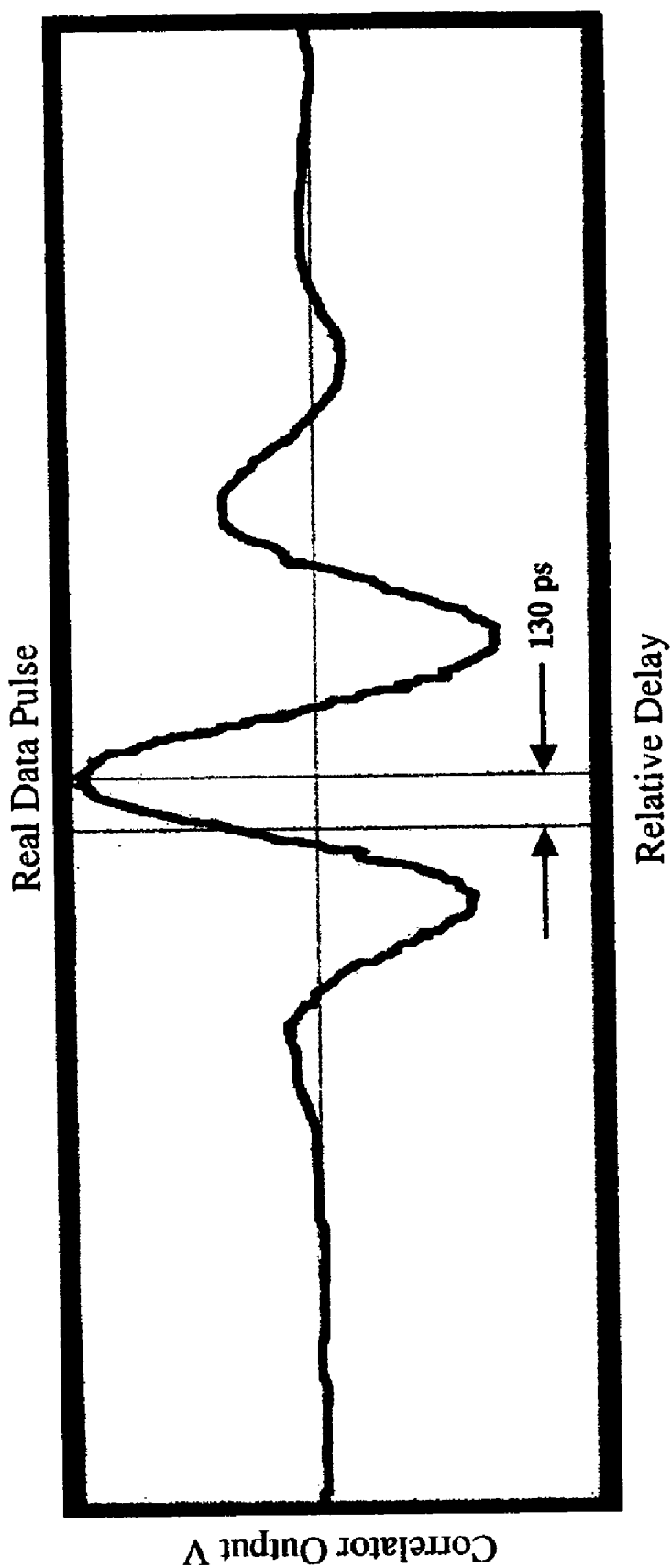
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
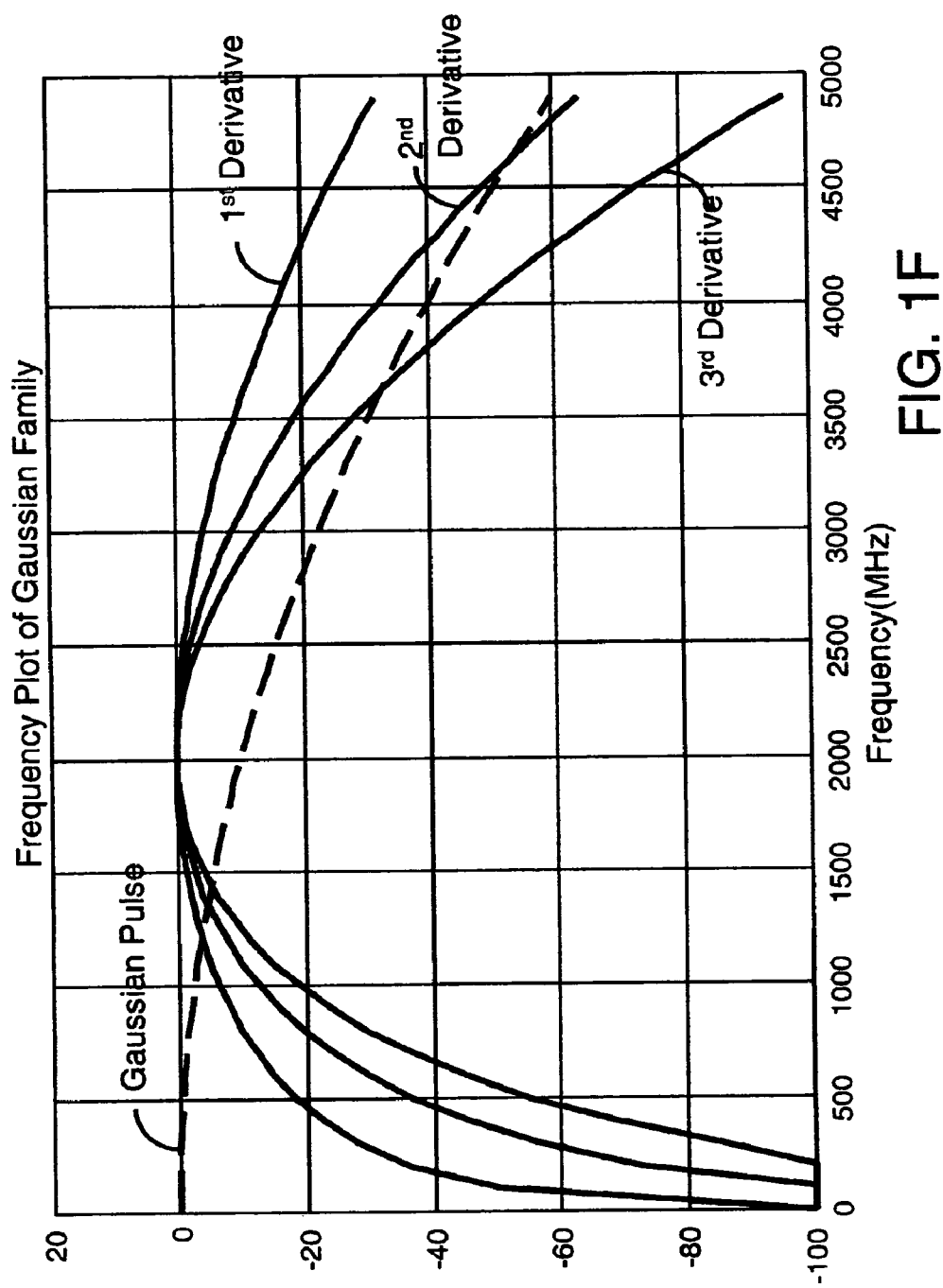
FIG. 1F graphically depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input.

Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t,b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left| \sum_{i=1}^{n} \frac{e^{j\Delta t}}{n} \right|$$

where $A(\omega)$ is the amplitude of the spectral response at a given frequency $\omega$ is the frequency being analyzed ($2\pi f$) $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
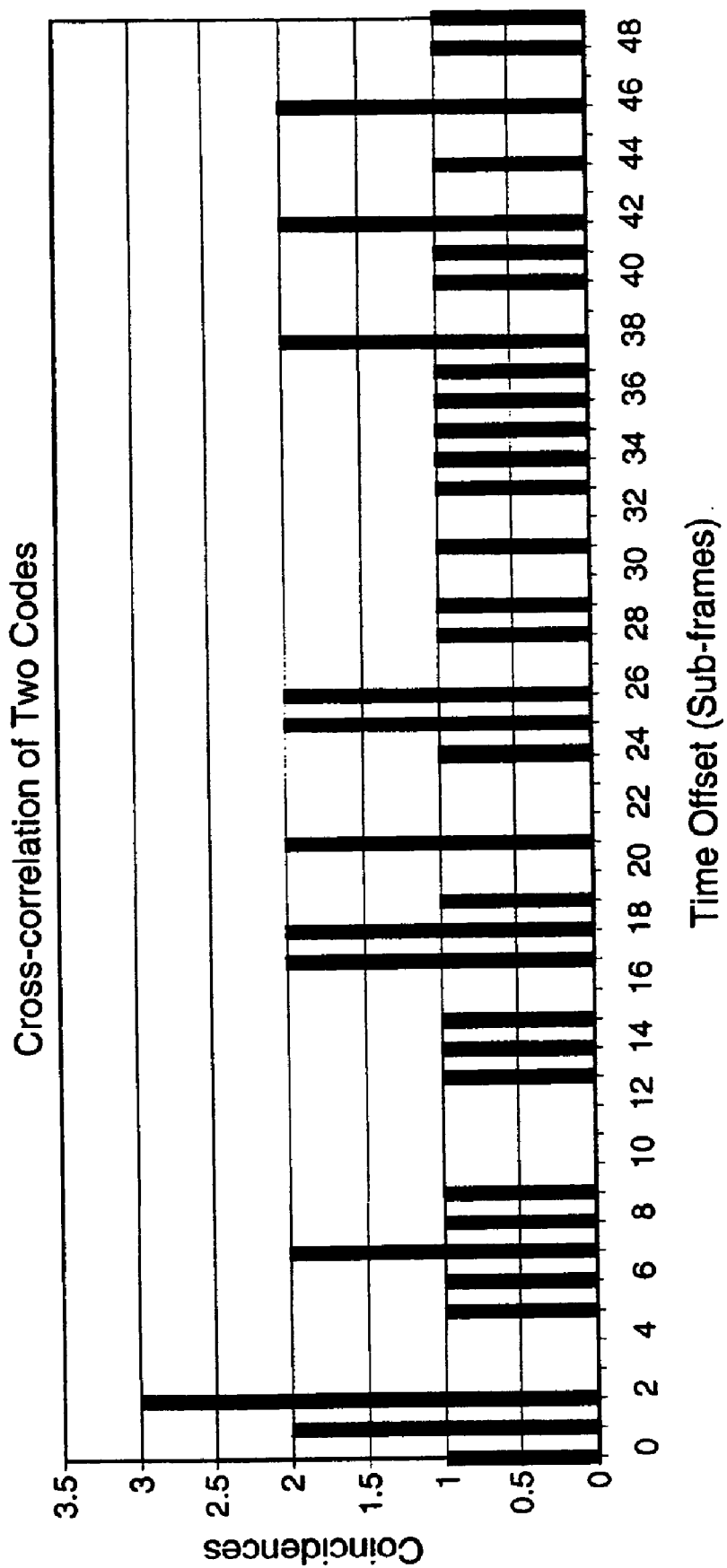
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592, 249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592, 290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses in Time" application Ser. No. 09/592,248 filed Jun. 12, 2000, and incorporated herein by reference.

The signal of a coded pulse train can be generally expressed by:

$$s_{tr}^{(k)}(t) = \sum_{j} (-1)^{f_j^{(k)}} a_j^{(k)} \omega\left(c_j^{(k)} t - T_j^{(k)}, b_j^{(k)}\right)$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register(s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592, 288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Positioning Pulses Over Time By Applying Time-Hopping Codes that have Predefined Characteristics" application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_{j} (-1)^{f_j^{(k)}} a_j^{(k)} \omega\left(c_j^{(k)} t - T_j^{(k)} - \delta d_{\lfloor j/N_s \rfloor}^{(k)}, b_j^{(k)}\right)$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, $\delta$ is the time shift added when the transmitted symbol is 1 (instead of 0), $d^{(k)}$ is the data (i.e., 0 or 1) transmitted by the kth transmitter, and $N_s$, is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," U.S. patent application Ser. No. 09/875,290, filed Jun. 7, 2001, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/538,519, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
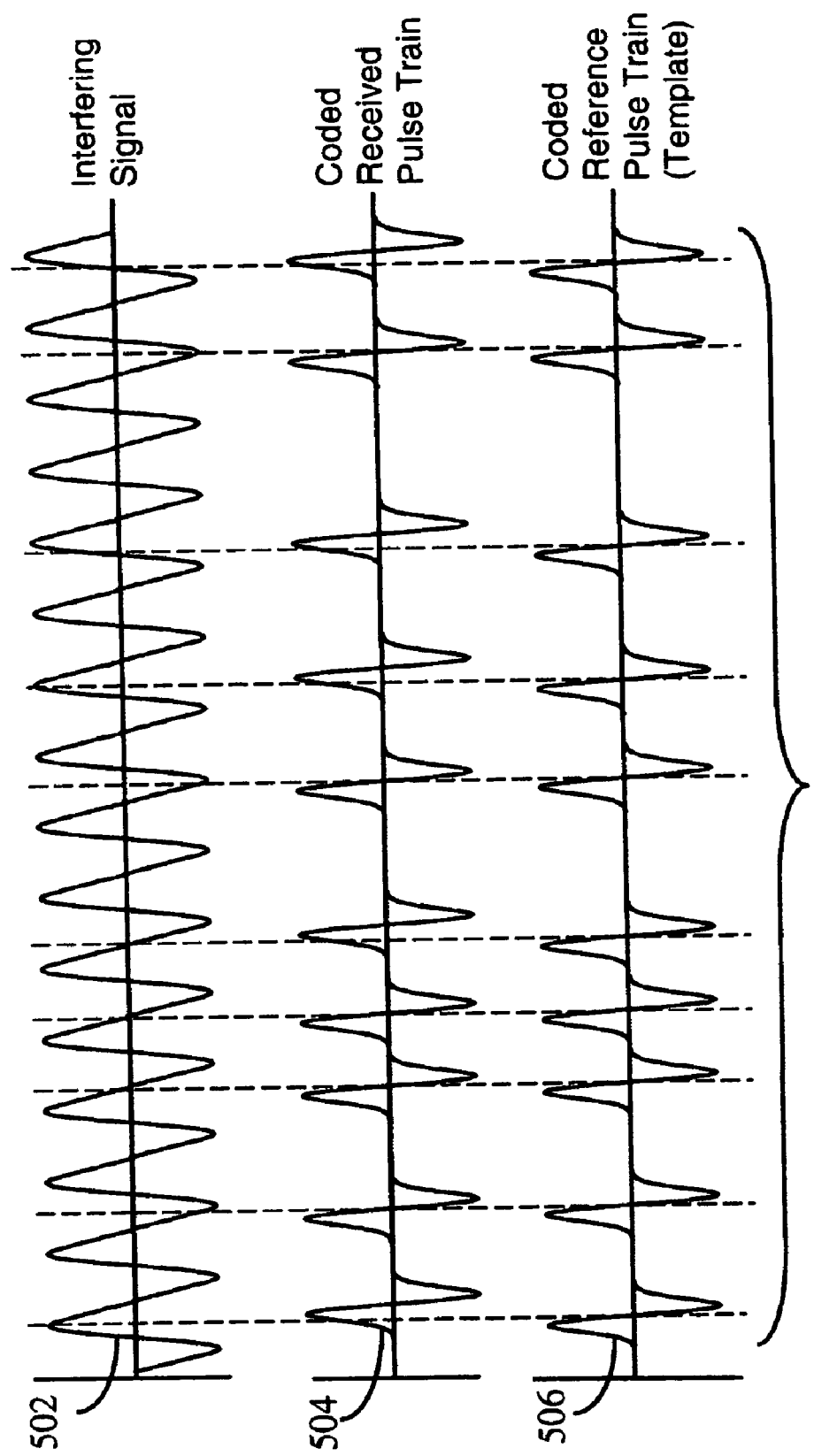
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)]dt \text{ and}$$

$$\sigma_a^2 = T_f^{-1} \int_{-\infty}^{\infty} \left[\int_{-\infty}^{\infty} \omega(t-s)v(t)dt\right]^2 ds,$$

where $\omega(t)$ is the monocycle waveform, $u(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

Figure 5G:
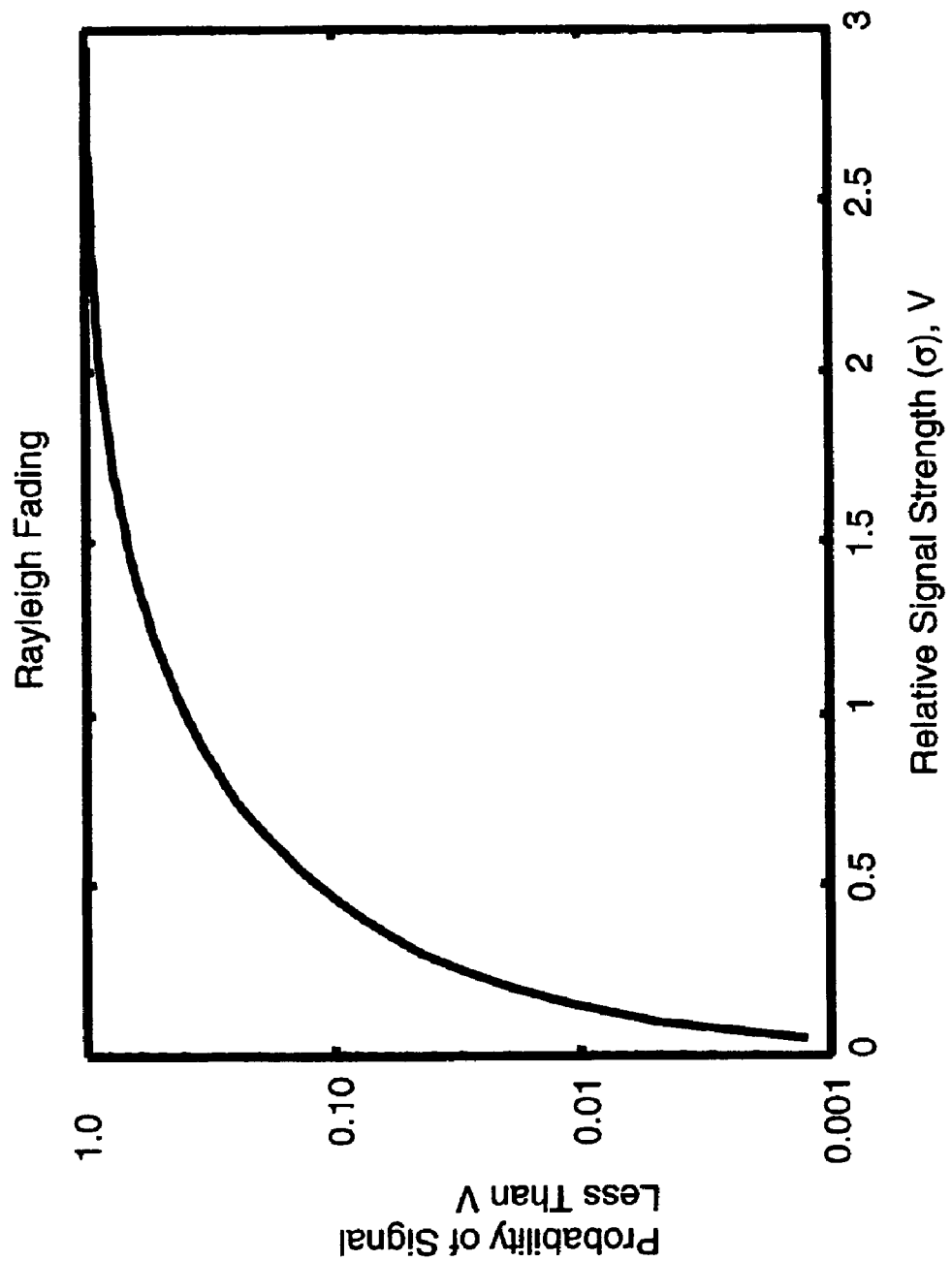
FIGS. 5G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 5G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5H:
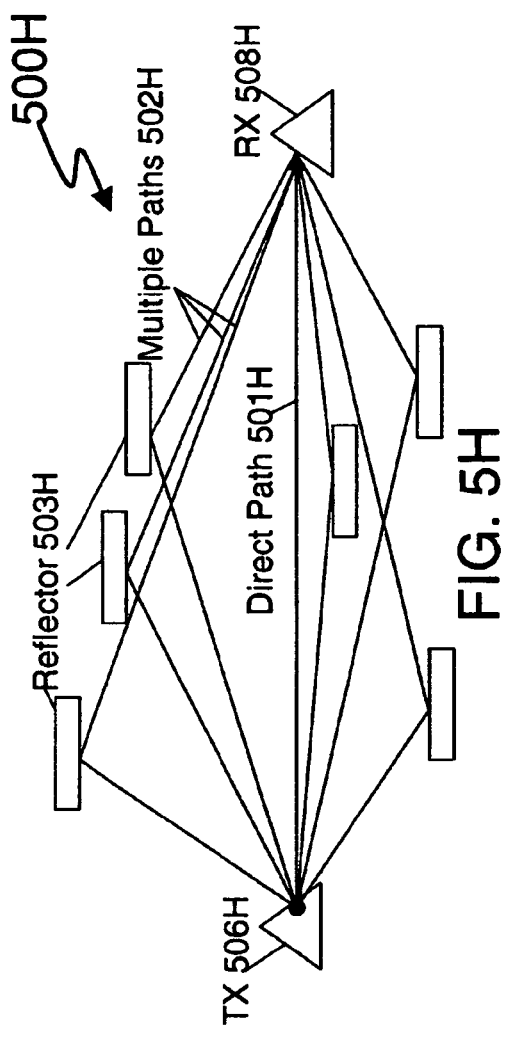
FIG. 5H illustrates a plurality of multipaths with a plurality of reflectors from a transmitter to a receiver.
Figure 5I:
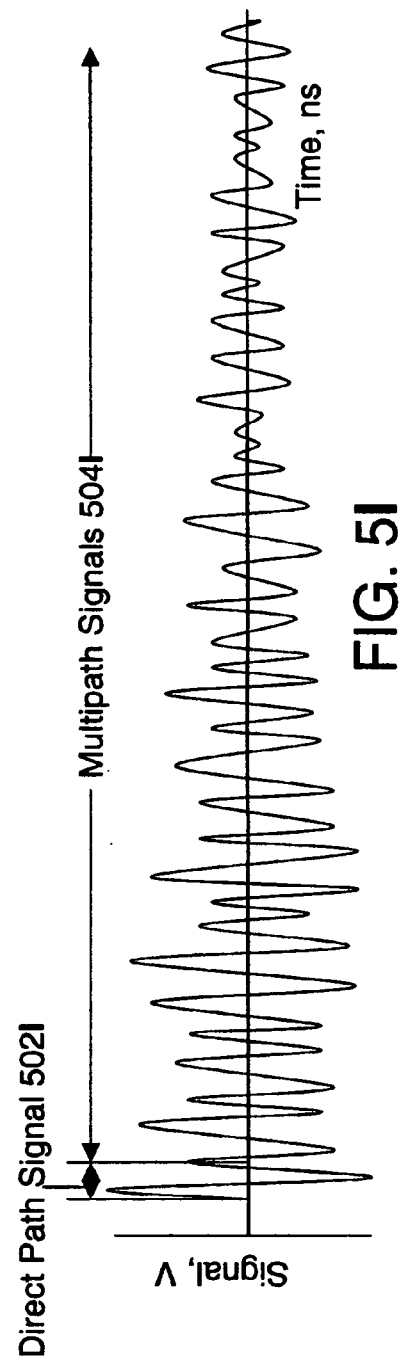
FIG. 5I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIG. 5H and 5I. FIG. 5H depicts an impulse radio system in a high multipath environment 500H consisting of a transmitter 506H and a receiver 508H. A transmitted signal follows a direct path 501H and reflects off reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. In the same manner described earlier for FIGS. 5B and 5C, the direct path signal 502I is sampled, while the multipath signals 504I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned U.S. Pat. No. 6,300,903 titled "System and Method for Person or Object Position Location Utilizing Impulse Radio," and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see U.S. Pat. No. 6,539,213 titled "System and Method for Impulse Radio Power Control," assigned to the assignee of the present invention, and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distal receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 2, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see patent application titled "Method and Apparatus for Moderating Interference While Effecting Impulse Radio Wireless Control of Equipment," application Ser. No. 09/586,163, filed Jun. 2, 1999, and assigned to the assignee of the present invention, and incorporated herein by reference.

Exemplary Transceiver Implementation

Transmitter

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 is coupled to a subcarrier demodulator 732, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to position in time the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned U.S. Pat. No. 6,304,623 titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see U.S. Pat. No. 6,556,621 titled "Method and System for Fast Acquisition of Ultra Wideband Signals," assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see U.S. Pat. No. 6,421,389 titled "Baseband Signal Converter for a Wideband Impulse Radio Receiver," and incorporated herein by reference.

PREFERRED EMBODIMENTS OF THE PRESENT INVENTION

Referring to FIGS. 9–23, there are disclosed several embodiments of a danger proximity warning system 900 and preferred method 1000 in accordance with the present invention. Although a majority of the embodiments of the danger proximity warning system 900 described below are related to preventing injuries due to railroad collisions, it should be appreciated that the danger proximity warning system 900 can also be used to help prevent injuries or warn people about a wide-variety of dangerous situations.

Figure 9:
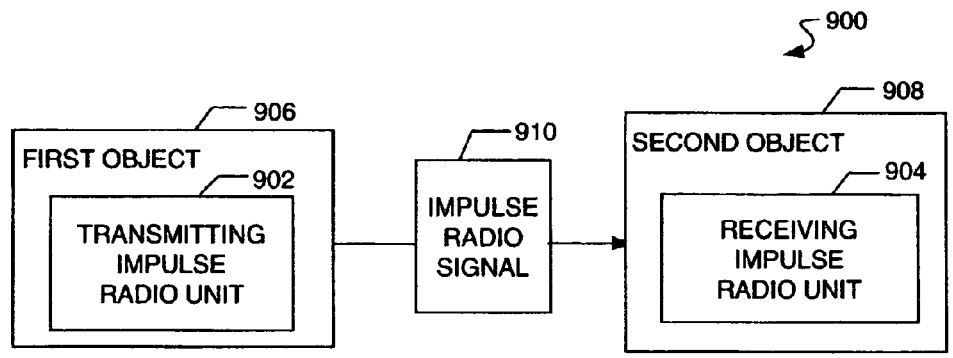
FIG. 9 is a block diagram illustrating the basic components of a danger proximity warning system of the present invention.
Figure 10:
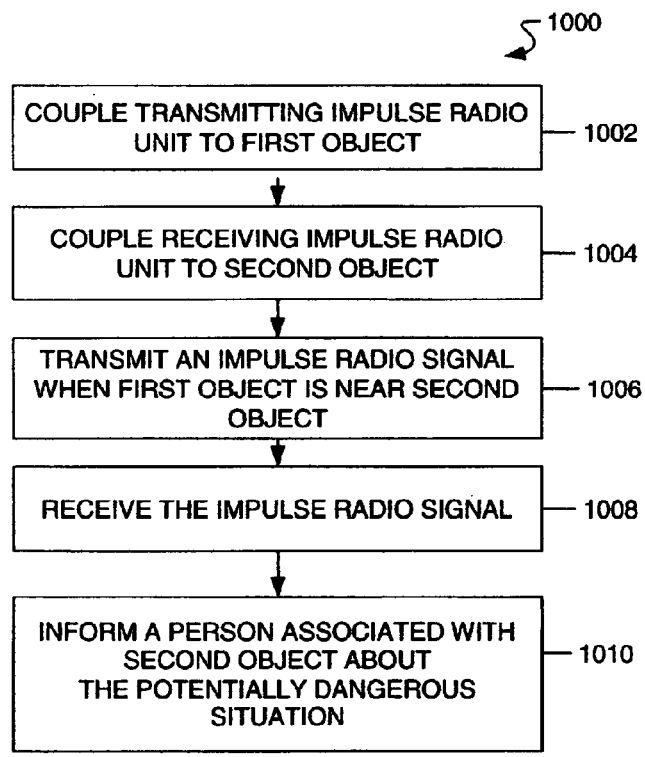
FIG. 10 is a flowchart illustrating the basic steps of a preferred method of the present invention that helps to prevent accidents.

Referring to FIGS. 9 and 10, there are a block diagram illustrating the basic components of the danger proximity warning system 900 and a flowchart illustrating the basic steps of a preferred method 1000. Basically, the danger proximity warning system 900 includes a transmitting impulse radio unit 902 (see impulse radio transmitter 602 of FIG. 6) and a receiving impulse radio unit 904 (see impulse radio receiver 702 of FIG. 7). The transmitting impulse radio unit 902 can be coupled (step 1002) to a first object 906 such as a locomotive or a control box that is located next to railroad tracks and is capable of sensing the presence of a locomotive. And, the receiving impulse radio unit 904 can be coupled (step 1004) to a second object 908 such as a vehicle, railroad pole, work vehicle or another locomotive.

In operation, the transmitting impulse radio unit 902 is capable of transmitting (step 1006) an impulse radio signal 910 towards the receiving impulse radio unit 904 and the second object 908 when there is a potentially dangerous situation such as when a moving locomotive is in the vicinity of the second object 908. Upon receiving (step 1008) the impulse radio signal 910, the receiving impulse radio unit 904 makes sure a person associated with the second object 908 is informed (step 1010) about the potentially dangerous situation. As will be described in greater detail below with respect to the different embodiments of the present invention, the danger proximity warning system 900 can utilize on one chip the revolutionary position capabilities, radar capabilities and/or communication capabilities of impulse radio technology.

Figure 11:
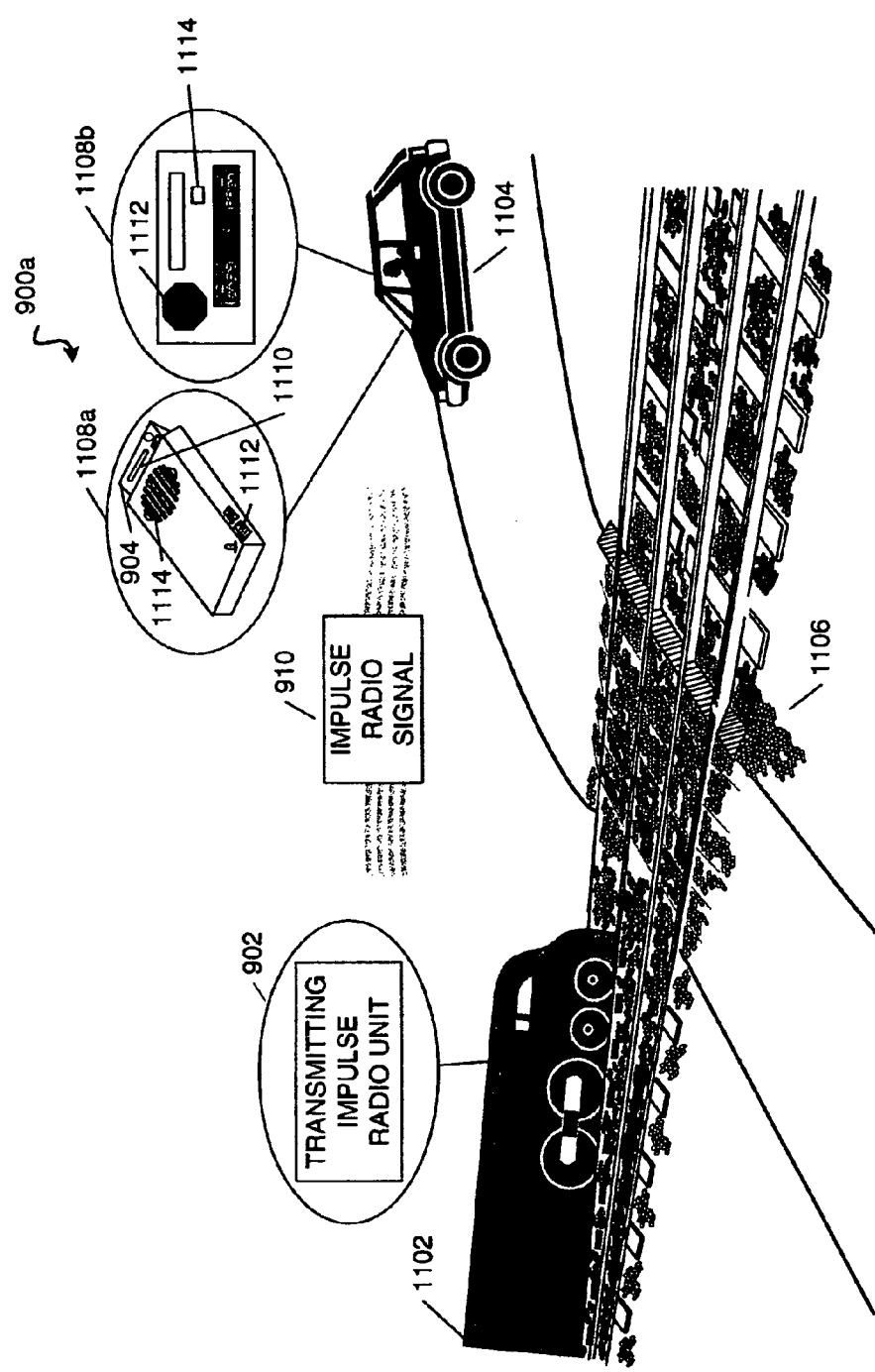
FIG. 11 is a diagram illustrating in greater detail the components of a first embodiment of the danger proximity warning system shown in FIG. 9, which is intended to avoid railroad collisions.
Figure 12:
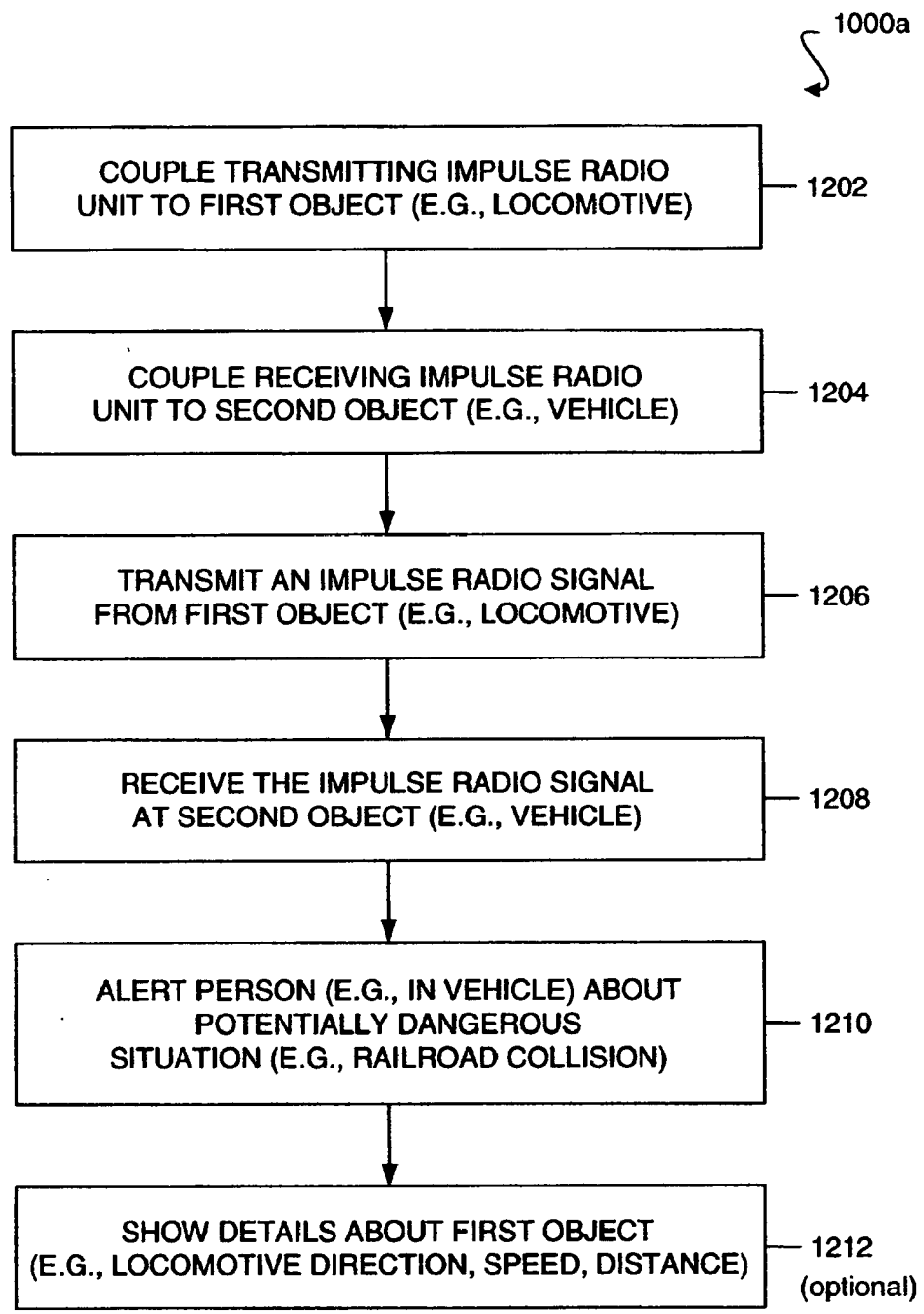
FIG. 12 is a flowchart illustrating in greater detail the steps of a first embodiment of the preferred method shown in FIG. 10, which is intended to avoid railroad collisions.

Referring to FIGS. 11 and 12, there are diagrams illustrating in greater detail the components and steps of a first embodiment of the danger proximity warning system 900a and method 1000a. In this embodiment, the danger proximity warning system 900 includes a transmitting impulse radio unit 902 coupled (step 1202) to a first object such as locomotive 1102 and a receiving impulse radio unit 904 coupled (step 1204) to a second object such as vehicle 1104 (shown as a car). The transmitting impulse radio unit 902 operates to transmit (step 1206) an impulse radio signal 910 having a known pseudorandom sequence of pulses that look like a series of Gaussian waveforms (see FIGS. 1–3) towards the receiving impulse radio unit 904 attached to the second object (e.g., vehicle 1104). In particular, the transmitting impulse radio unit 902 may continually transmit the impulse radio signal 910 or it may transmit the impulse radio signal 910 whenever an alert condition is met such as when a whistle on the locomotive 1102 is activated to indicate that the locomotive 1102 is a predetermined distance from a railroad crossing 1106 (shown as a passive railroad crossing without a railroad pole).

Upon receiving (step 1208) the impulse radio signal 910, the receiving impulse radio unit 904 makes sure that the person associated with the second object such as a person operating the vehicle 1104 is alerted (step 1210) about the potentially dangerous situation. For instance, the receiving impulse radio unit 904 may be incorporated within or coupled to an after-market display 1108a (showing the receiving impulse radio unit 904) or an in-dash display 1108b (not showing the receiving impulse radio unit 904). Either display 1108a or 1108b is capable of alerting a person that there is potentially dangerous situation such as a locomotive 1102 in their vicinity by generating an alarm (see light 1112) or voice message (see speaker 1114). Moreover, a person could use the display 1108 having a transmitting impulse radio unit (not shown) to communicate with a person (e.g., a person on the locomotive 1102) having a receiving impulse radio unit (not shown).

In addition, either display 1108a and 1108b is capable of showing (step 1212) information about the dangerous situation such as the direction, distance and/or speed of the oncoming locomotive 1102. To determine the distance that the first object (e.g., locomotive 1102) is from the second object (e.g., vehicle 1104), a controller 1110 within the receiving impulse unit 904 can use the revolutionary positioning capabilities of impulse radio technology. In particular, the impulse radio signal 910 transmitted between the transmitting impulse radio unit 902 and the receiving impulse radio unit 904 enables the controller 1110 to measure distances to extremely fine resolution because of the absence of ambiguous cycles in the waveform of the impulse radio signal 910. In contrast, narrow band systems of traditional communication systems are limited to the modulation envelope and cannot easily distinguish precisely which RF cycle is associated with each data bit because the cycle-to-cycle amplitude differences are so small they are masked by link or system noise. Since the waveform of the impulse radio signal 910 does not have multi-cycle ambiguity, this allows the controller 1110 to positively determine the position of the waveform to less than a wavelength even when the waveform is in or near the noise floor of the system. The time position measurement can be used by the controller 1110 to measure the propagation delay and determine the link distance between the receiving impulse radio unit 904 and the transmitting impulse radio unit 902. Once, the distance is known and updated then the speed of the first object (e.g., locomotive 1102) can be determined by the controller 1110.

Figure 13:
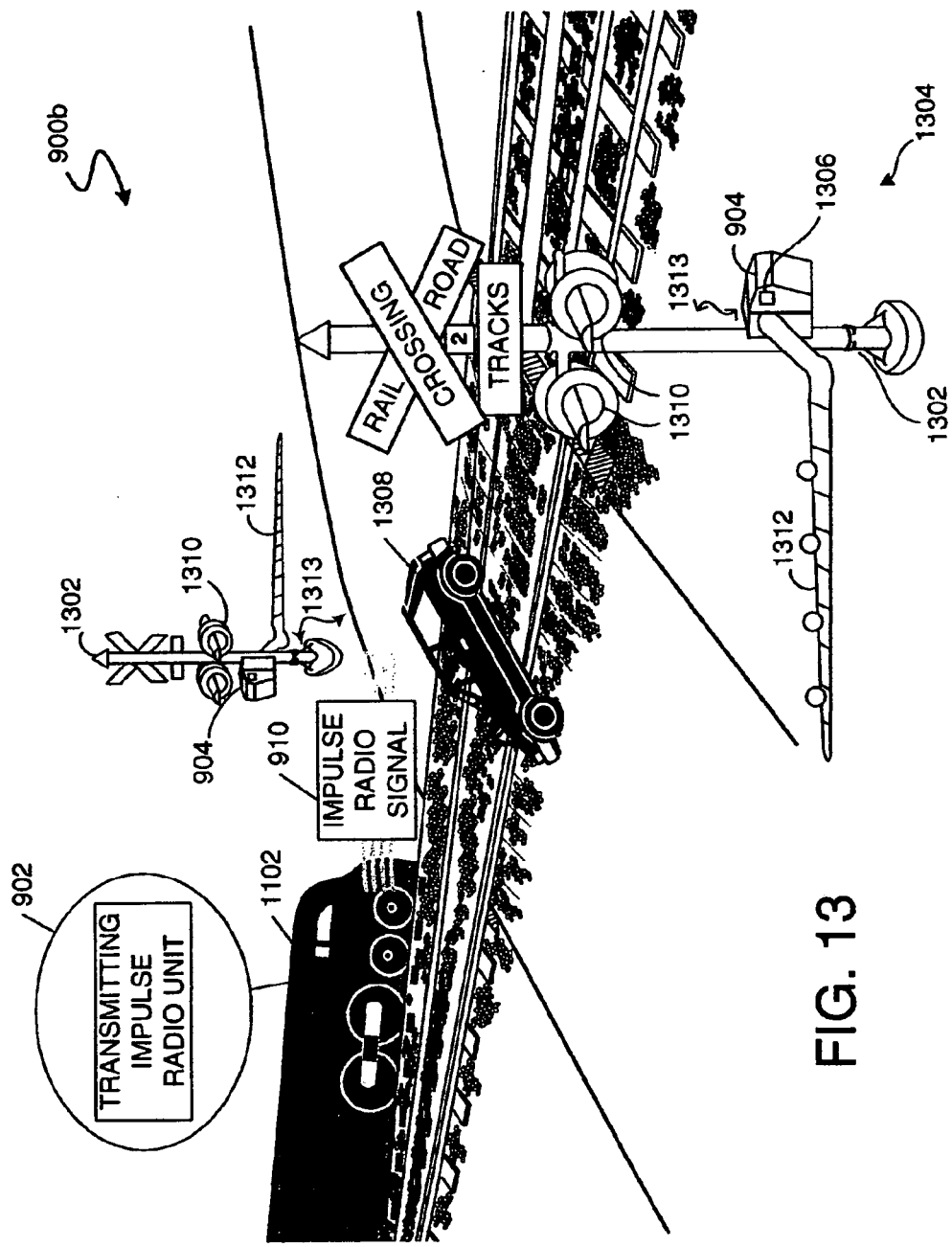
FIG. 13 is a diagram illustrating in greater detail the components of a second embodiment of the danger proximity warning system shown in FIG. 9, which is intended to avoid railroad collisions.
Figure 14:
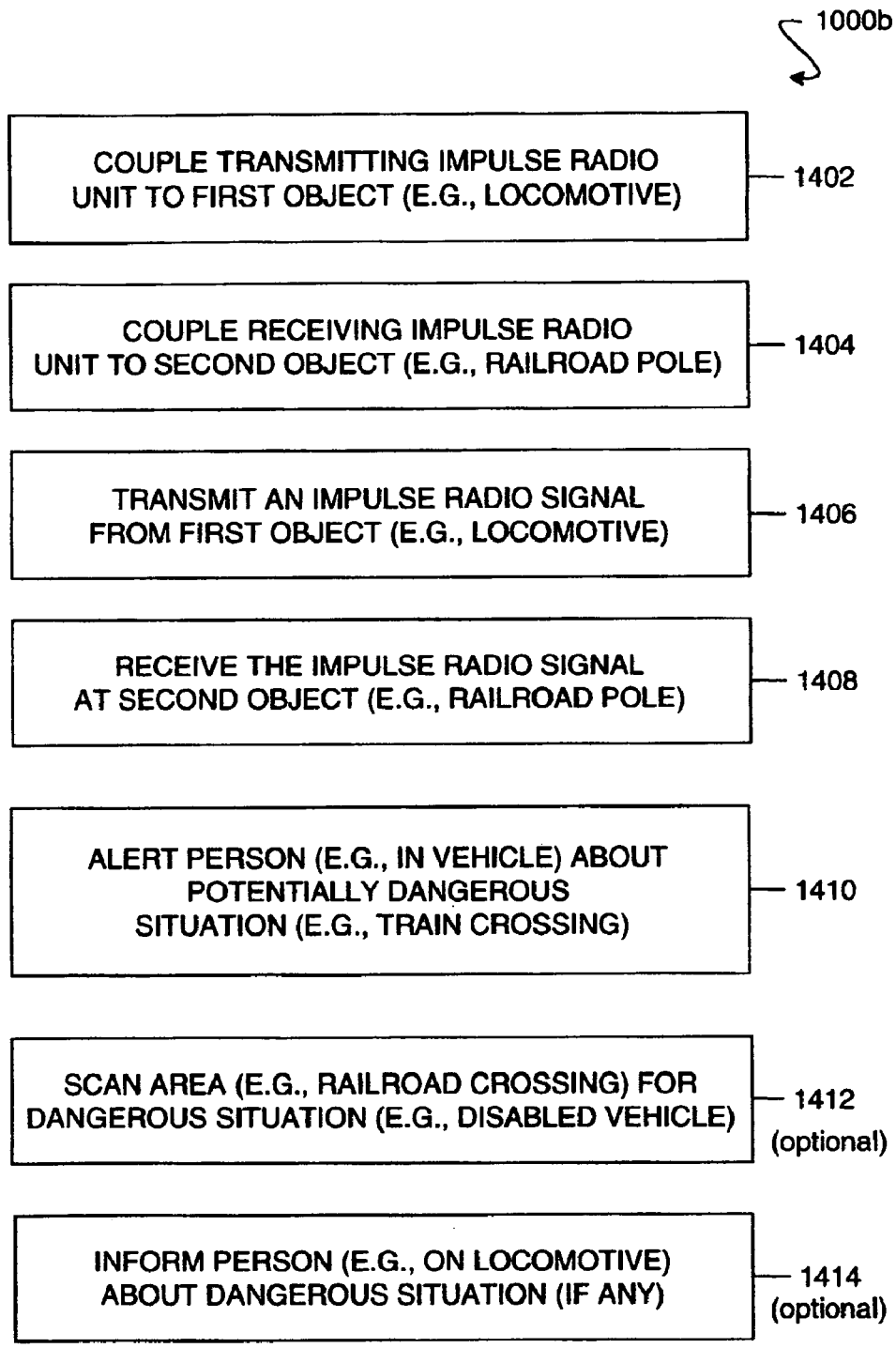
FIG. 14 is a flowchart illustrating in greater detail the steps of a second embodiment of the preferred method shown in FIG. 10, which is intended to avoid railroad collisions.

Referring to FIGS. 13 and 14, there are diagrams illustrating in greater detail the components and steps of a second embodiment of the danger proximity warning system 900*b* and method 1000*b*. In this embodiment, the danger proximity warning system 900*b* includes a transmitting impulse radio unit 902 coupled (step 1402) to a first object such as locomotive 1102 and a receiving impulse radio unit 904 coupled (step 1404) to a second object such as an active railroad pole 1302. The transmitting impulse radio unit 902 operates to transmit (step 1406) an impulse radio signal 910 having a known pseudorandom sequence of pulses that look like a series of Gaussian waveforms (see FIGS. 1–3) towards the receiving impulse radio unit 904 attached to the second object (e.g., railroad pole 1302 of which two are shown). In particular, the transmitting impulse radio unit 902 may continually transmit the impulse radio signal 910 or it may transmit the impulse radio signal 910 whenever a alert condition is met such as when a whistle on the locomotive 1302 is activated to indicate that the locomotive 1302 is about to pass through a railroad crossing 1304 (shown as an active railroad crossing).

Upon receiving (step 1408) the impulse radio signal 910, the receiving impulse radio unit 904 interacts with a controller 1306 (shown inside the receiving impulse radio unit 904) on the second object (e.g., railroad pole 1302), which makes sure that the person (e.g., the person operating a vehicle 1308) is alerted (step 1410) about the potentially dangerous situation. For instance, the controller 1306 can trigger a warning light 1310 or a retractable gate 1312 to warn a person within the vehicle 1104 that there is a locomotive 1102 approaching the railroad crossing 1304. Alternatively, the warning light 1310 may be solar powered and located on a railroad pole 1510 that would traditionally be associated with a passive railroad crossing (see FIG. 15). It should be understood that any second object such as vehicles 1104 that include the receiving impulse radio units 904 as described above with respect to FIG. 11 would also operate in this embodiment.

In addition, the receiving impulse radio unit 904 may utilize the radar capability of impulse radio technology to send impulse radio signals 1313 and possibly receive reflected radio signals 1313 in order to scan (step 1412) an area such as the railroad crossing 1304 to determine whether a dangerous situation exists such as disabled vehicle 1308 being located on the tracks of the railroad crossing 1304. If there is a dangerous situation, then the receiving impulse radio unit 904 can communicate with the transmitting impulse radio unit 902 to inform (step 1414) a person about the dangerous situation such as informing a person on the locomotive 1102 about the disabled vehicle 1308.

Figure 15:
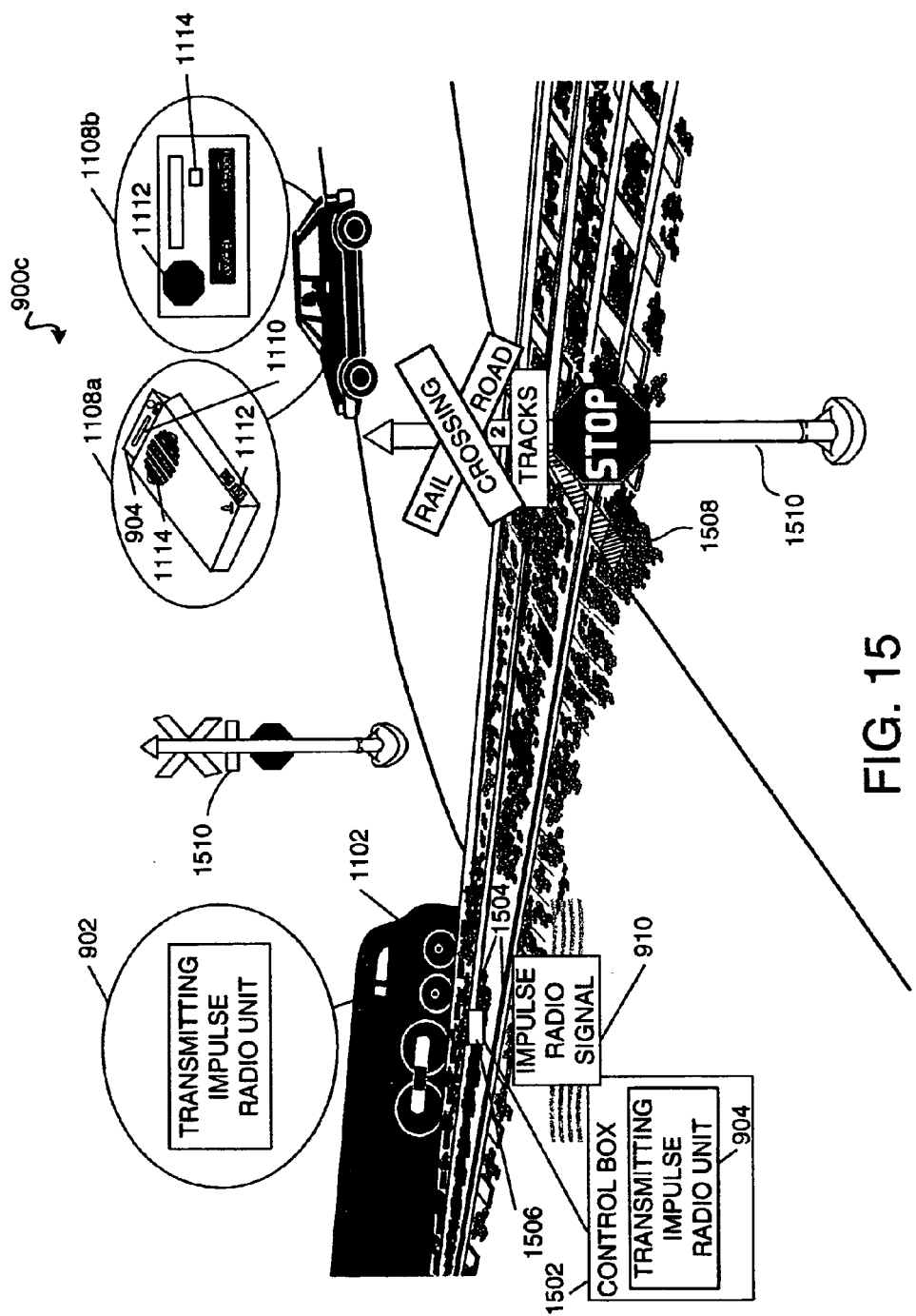
FIG. 15 is a diagram illustrating in greater detail the components of a third embodiment of the danger proximity warning system shown in FIG. 9, which is intended to avoid railroad collisions.
Figure 16:
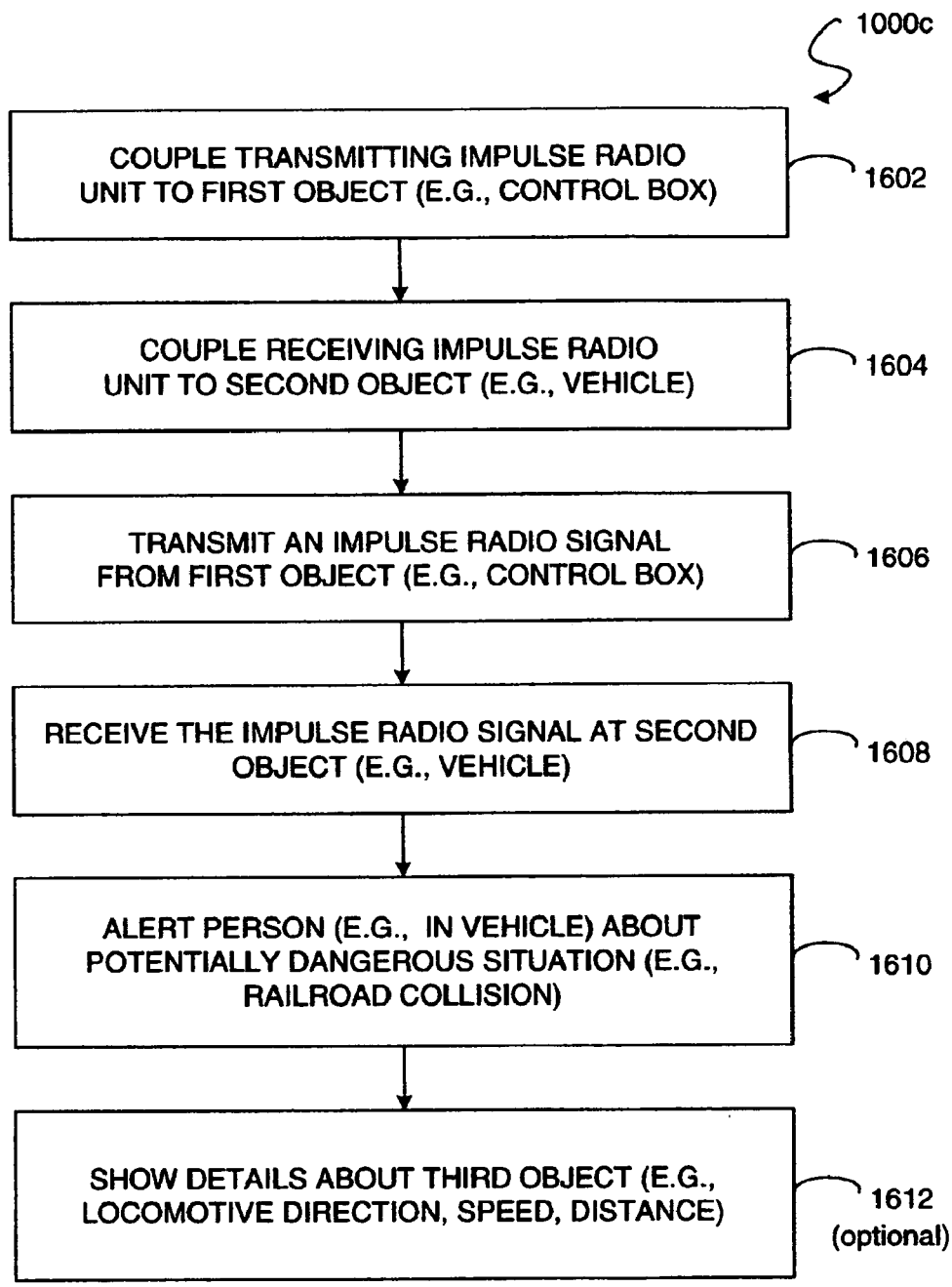
FIG. 16 is a flowchart illustrating in greater detail the steps of a third embodiment of the preferred method shown in FIG. 10, which is intended to avoid railroad collisions.

Referring to FIGS. 15 and 16, there are diagrams illustrating in greater detail the components and steps of a third embodiment of the danger proximity warning system 900*c* and method 1000*c*. In this embodiment, the danger proximity warning system 900*c* includes a transmitting impulse radio unit 902 coupled (step 1602) to a first object such as control box 1502 and a receiving impulse radio unit 904 coupled (step 1604) to a second object such as vehicle 1104. The control box 1502 is located in a monitoring location such as next to railroad tracks 1504 and is capable of using a sensor 1506 (e.g., electromagnetic sensor, motion detector, percussion sensor) to sense the presence of a third object (e.g., locomotive 1102). Moreover, the control box 1502 can be powered by a variety of power sources including, for example, a solar battery or a power line.

The transmitting impulse radio unit 902 operates to transmit an impulse radio signal 910 having a known pseudorandom sequence of pulses that look like a series of Gaussian waveforms (see FIGS. 1–3) towards the receiving impulse radio unit 904 attached to the second object (e.g., vehicle 1104). In particular, the transmitting impulse radio unit 902 may transmit the impulse radio signal 910 when the sensor 1506 detects a potentially dangerous situation such as the presence of the locomotive 1102 near a railroad crossing 1508 (shown as a passive railroad crossing with a railroad pole 1510).

Upon receiving (step 1608) the impulse radio signal 910, the receiving impulse radio unit 904 makes sure that the person (e.g., operating the vehicle 1104) is alerted (step 1610) about the potentially dangerous situation. For instance, the receiving impulse radio unit 904 may be incorporated within or coupled to an after-market display 1108*a* (showing the receiving impulse radio unit 904) or an in-dash display 1108*b* (not showing the receiving impulse radio unit 904). Either display 1108*a* or 1108*b* is capable of alerting a person about the potentially dangerous situation, for example, that there is a third object (e.g., locomotive 1102) in their vicinity, by generating an alarm (see light 1112) or voice message (see speaker 1114). Moreover, a person could use the display 1108 having a transmitting impulse radio unit (not shown) to communicate with a person on the locomotive 1102 having a receiving impulse radio unit (not shown).

In addition, either display 1108*a* or 1108*b* is capable of showing (step 1612) information about the potentially dangerous situation such as the direction, distance and/or speed of the oncoming locomotive 1102. To determine the distance that the first object (e.g., locomotive 1102) is from the second object (e.g., vehicle 1308), a controller 1110 within the receiving impulse unit 904 can use the revolutionary positioning capabilities of impulse radio technology. In particular, the impulse radio signal 910 transmitted between the transmitting impulse radio unit 902 and the receiving impulse radio unit 904 enables the controller 1110 to measure distances to extremely fine resolution because of the absence of ambiguous cycles in the waveform of the impulse radio signal 910. In contrast, narrow band systems of traditional communication systems are limited to the modulation envelope and cannot easily distinguish precisely which RF cycle is associated with each data bit because the cycle-to-cycle amplitude differences are so small they are masked by link or system noise. Since the waveform of the impulse radio signal 910 does not have multi-cycle ambiguity, this allows the controller 1110 to positively determine the position of the waveform to less than a wavelength even when the waveform is in or near the noise floor of the system. The time position measurement can be used by the controller 1110 to measure the propagation delay and determine the link distance between the receiving impulse radio unit 904 and the transmitting impulse radio unit 902. Once, the distance is known and updated then the speed of the third object (e.g., locomotive 1102) can be determined by the controller 1110.

Figure 17:
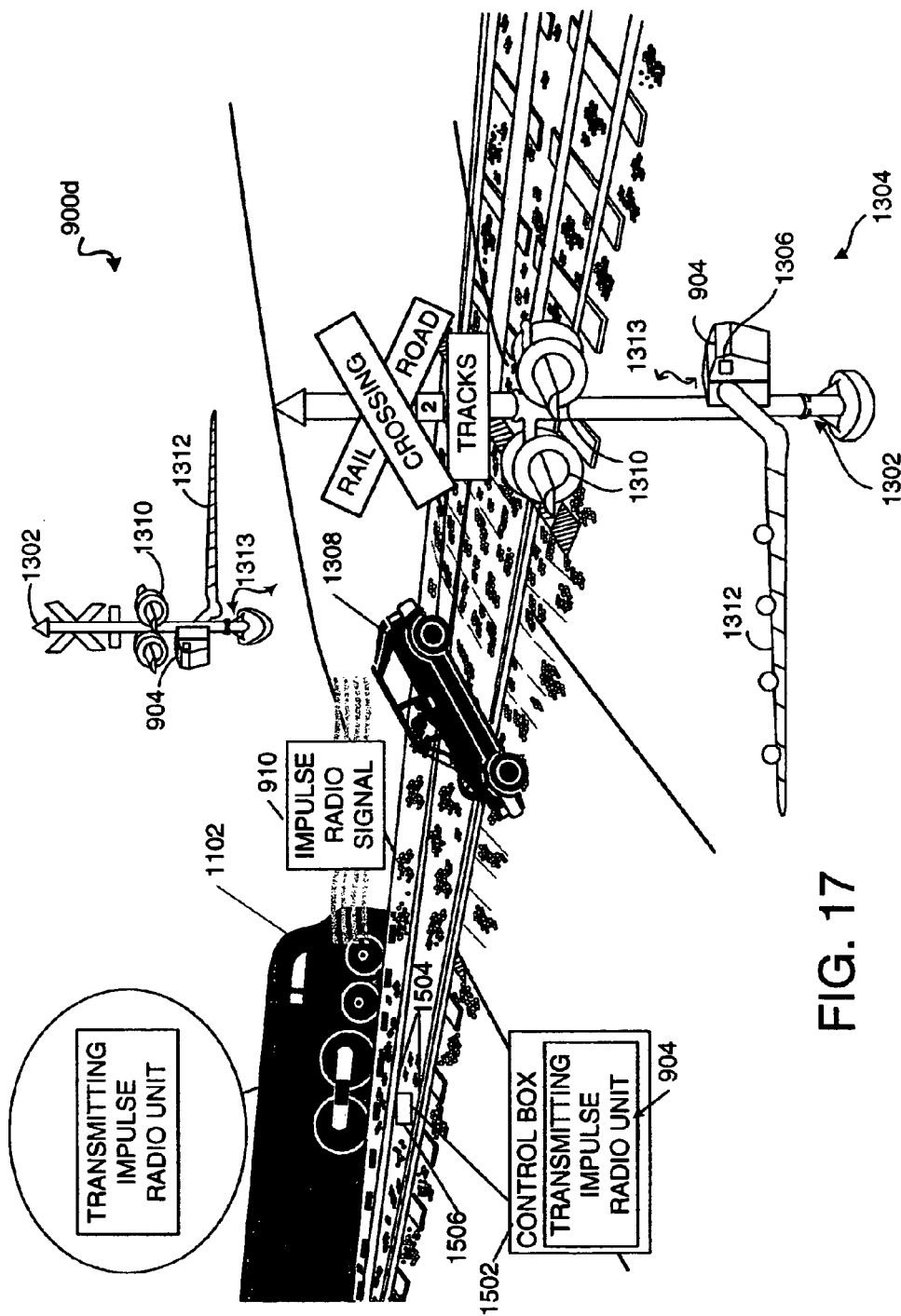
FIG. 17 is a diagram illustrating in greater detail the components of a fourth embodiment of the danger proximity warning system shown in FIG. 9, which is intended to avoid railroad collisions.
Figure 18:
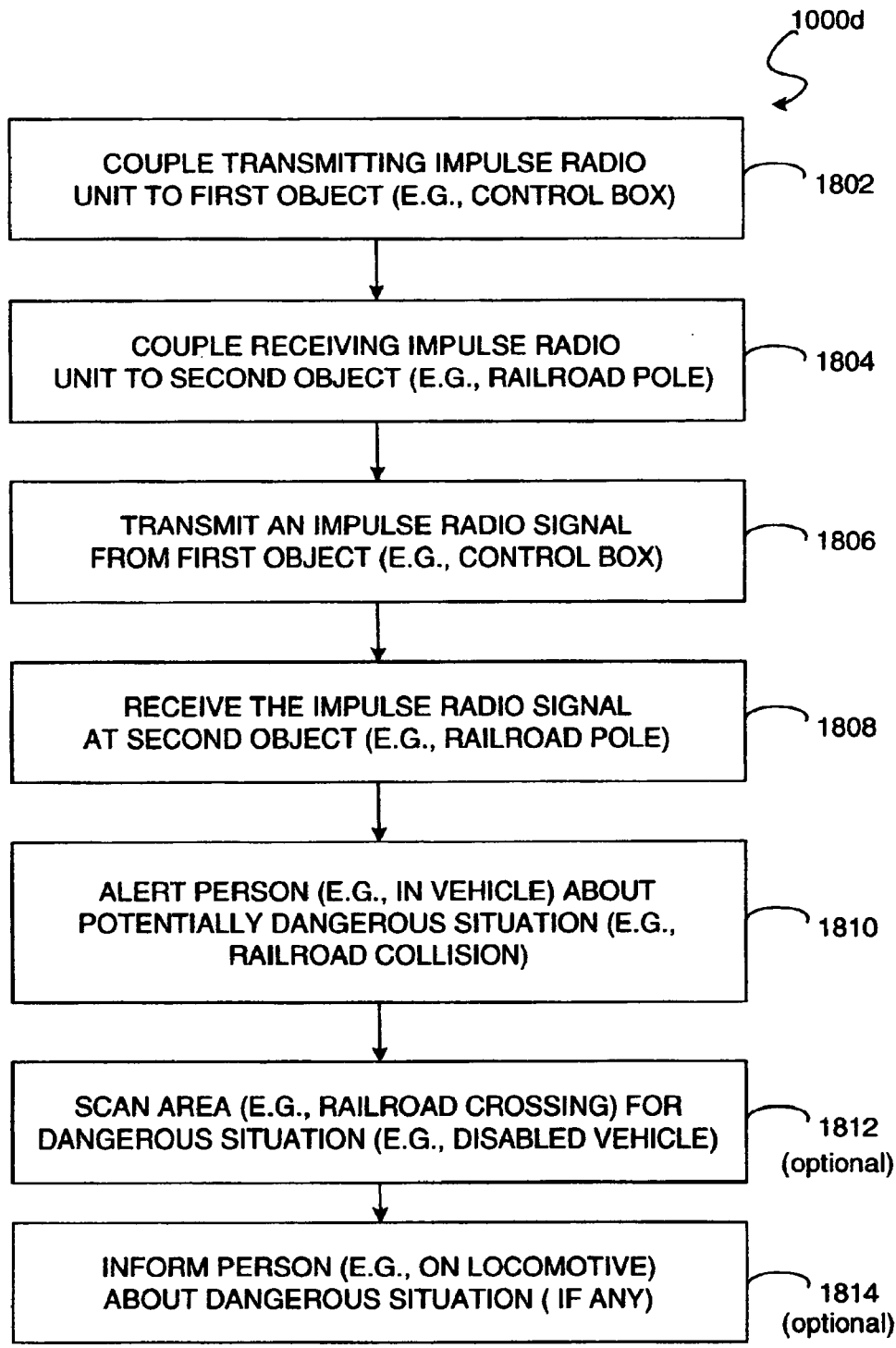
FIG. 18 is a flowchart illustrating in greater detail the steps of a fourth embodiment of the preferred method shown in FIG. 10, which is intended to avoid railroad collisions.

Referring to FIGS. 17 and 18, there are diagrams illustrating in greater detail the components and steps of a fourth embodiment of the danger proximity warning system 900d and method 1000d. In this embodiment, the danger proximity warning system 900d includes a transmitting impulse radio unit 902 coupled (step 1802) to a first object such as control box 1502 and a receiving impulse radio unit 904 coupled (step 1804) to a second object such as railroad pole 1302. The first object (e.g., control box 1502) is located at a monitoring location such as next to railroad tracks 1504 and is capable of using a sensor 1506 (e.g., electromagnetic sensor, motion detector, percussion sensor) to sense the presence of a third object (e.g., locomotive 1102). Moreover, the control box 1502 can be powered by a variety of power sources including, for example, a solar battery or a power line.

The transmitting impulse radio unit 902 operates to transmit (step 1806) an impulse radio signal 910 having a known pseudorandom sequence of pulses that look like a series of Gaussian waveforms (see FIGS. 1–3) towards the receiving impulse radio unit 904 attached to second object (e.g., railroad pole 1302). In particular, the transmitting impulse radio unit 902 may transmit the impulse radio signal 910 when the sensor 1506 detects a dangerous situation such as the presence of the locomotive 1102 near a railroad crossing 1304 (shown as an active railroad crossing).

Upon receiving (step 1806) the impulse radio signal 910, the receiving impulse radio unit 904 interacts with a controller 1306 (shown inside the receiving impulse radio unit 904) on the railroad pole 1302, which makes sure that the person (e.g., operating the vehicle 1308) is alerted (step 1810) about the potentially dangerous situation. For instance, the controller 1306 can trigger a warning light 1310 or a retractable gate 1312 to warn a person within the vehicle 1308 that there is a locomotive 1102 approaching the railroad crossing 1304. Alternatively, the warning light 1310 may be solar powered and located on a railroad pole 1510 that would traditionally be associated with a passive railroad crossing (see FIG. 15). It should be understood that any vehicles 1104 that include the receiving impulse radio units 904 as described above with respect to FIG. 11 would also operate in this embodiment.

In addition, the receiving impulse radio unit 904 may utilize the radar capability of impulse radio technology to send impulse radio signals 1313 and possibly receive reflected radio signals 1313 in order to scan (step 1812) the railroad crossing 1304 to determine whether a disabled vehicle 1308 is located on the tracks of the railroad crossing 1304. If there is a disabled vehicle 1308, then the receiving impulse radio unit 904 can communicate with the transmitting impulse radio unit 902 to inform (step 1814) a person on the locomotive 1102 about the disabled vehicle 1308.

Figure 19:
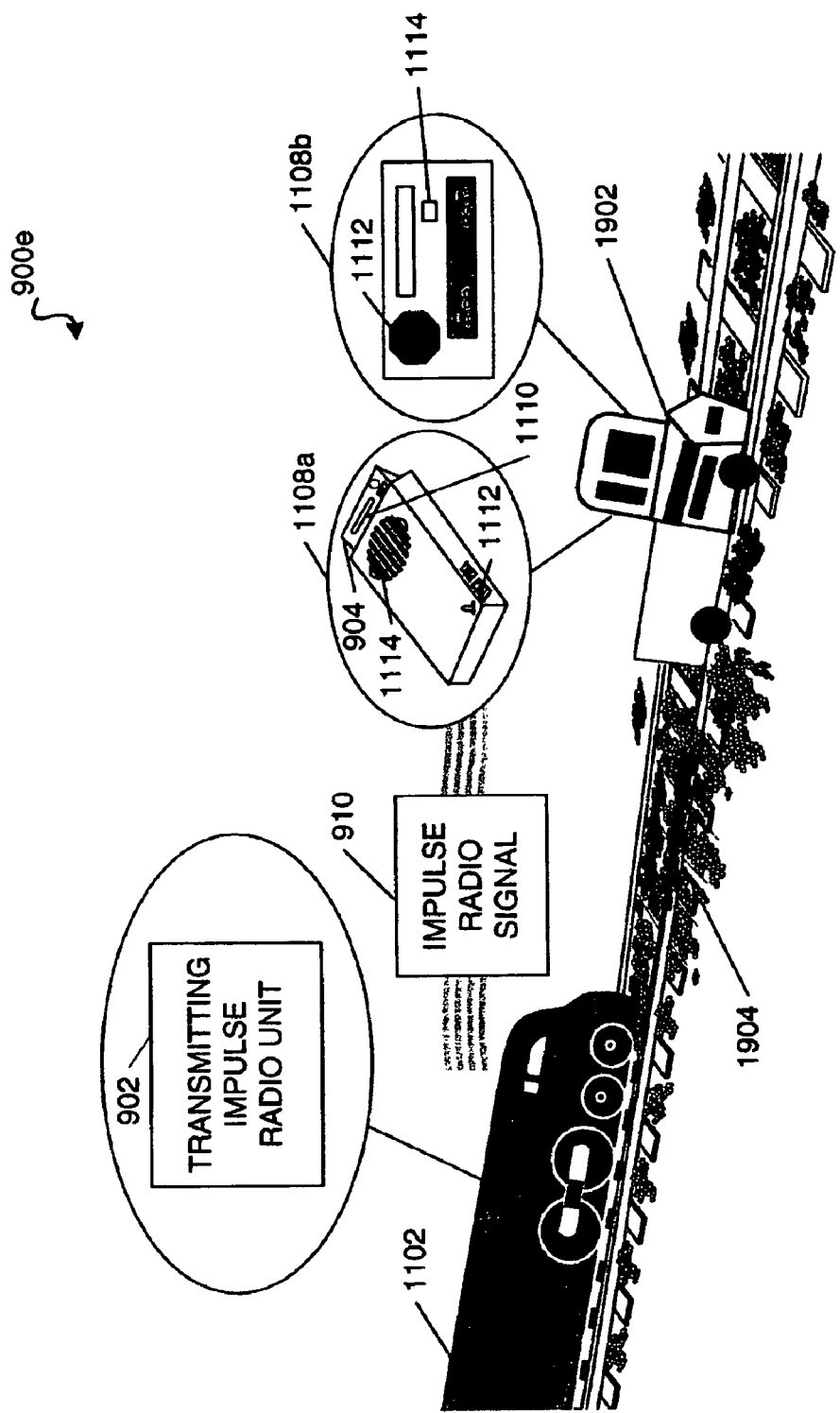
FIG. 19 is a diagram illustrating in greater detail the components of a fifth embodiment of the danger proximity warning system shown in FIG. 9, which is intended to avoid railroad collisions.
Figure 20:
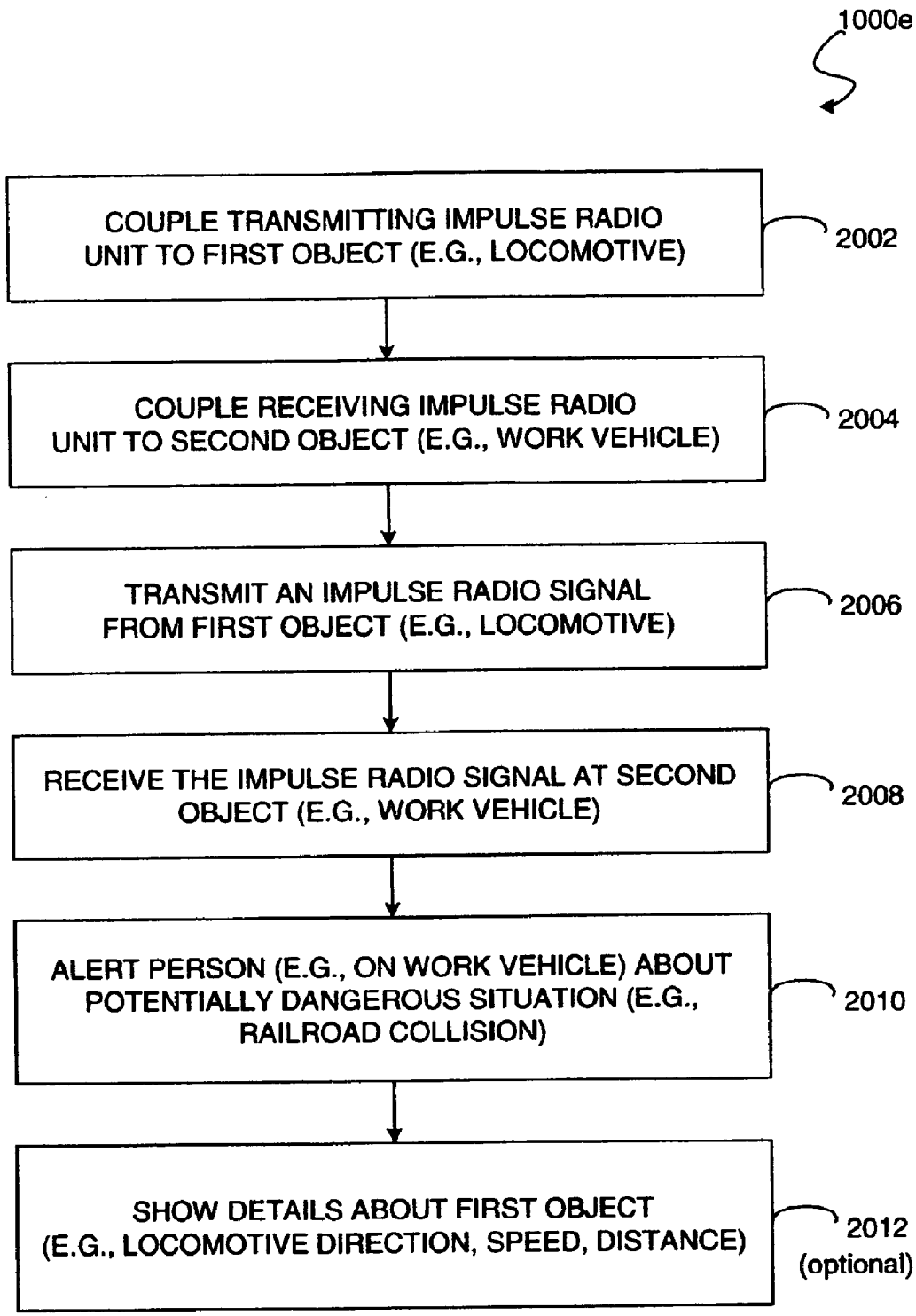
FIG. 20 is a flowchart illustrating in greater detail the steps of a fifth embodiment of the preferred method shown in FIG. 10, which is intended to avoid railroad collisions.

Referring to FIGS. 19 and 20, there are diagrams illustrating in greater detail the components and steps of a fifth embodiment of the danger proximity warning system 900e and method 1000e. In this embodiment, the danger proximity warning system 900e includes a transmitting impulse radio unit 902 coupled (step 2002) to a first object such as locomotive 1102 and a receiving impulse radio unit 904 coupled (step 2004) to a second object such as work vehicle 1902. Since the locomotive 1102 would normally not be aware of the presence of the work vehicle 1902 on the same railroad tracks 1904, the transmitting impulse radio unit 902 may continually transmit (step 2006) an impulse radio signal 910. As described above, the impulse radio signal 910 has a known pseudorandom sequence of pulses that look like a series of Gaussian waveforms (see FIGS. 1–3).

Upon receiving (step 2008) the impulse radio signal 910, the receiving impulse radio unit 904 makes sure that the person associated with the second object (e.g., a person operating the work vehicle 1902) is alerted (step 2010) about the potentially dangerous situation. For instance, the receiving impulse radio unit 904 may be incorporated within or coupled to an after-market display 1108a (showing the receiving impulse radio unit 904) or an in-dash display 1108b (not showing the receiving impulse radio unit 904). Either display 1108a or 1108b is capable of alerting a person that there is a potentially dangerous situation, such as a locomotive 1102 in their vicinity, by generating an alarm (see light 1112) or voice message (see speaker 1114). Moreover, a person could use the display 1108 having a transmitting impulse radio unit (not shown) to communicate with a person on the locomotive 1102 having a receiving impulse radio unit (not shown).

In addition, either display 1108a or 1108b is capable of showing (step 2012) information about the potentially dangerous situation such as the direction, distance and/or speed of the oncoming locomotive 1102. To determine the distance that the first object (e.g., locomotive 1102) is from the second object (e.g., work vehicle 1902), a controller 1110 within the receiving impulse unit 904 can use the revolutionary positioning capabilities of impulse radio technology. In particular, the impulse radio signal 910 transmitted between the transmitting impulse radio unit 902 and the receiving impulse radio unit 904 enables the controller 1110 to measure distances to extremely fine resolution because of the absence of ambiguous cycles in the waveform of the impulse radio signal 910. In contrast, narrow band systems of traditional communication systems are limited to the modulation envelope and cannot easily distinguish precisely which RF cycle is associated with each data bit because the cycle-to-cycle amplitude differences are so small they are masked by link or system noise. Since the waveform of the impulse radio signal 910 does not have multi-cycle ambiguity, this allows the controller 1110 to positively determine the position of the waveform to less than a wavelength even when the waveform is in or near the noise floor of the system. The time position measurement can be used by the controller 1110 to measure the propagation delay and determine the link distance between the receiving impulse radio unit 904 and the locomotive 1102. Once, the distance is known and updated then the speed of the first object (e.g., locomotive 1102) can be determined by the controller 1110.

Figure 21:
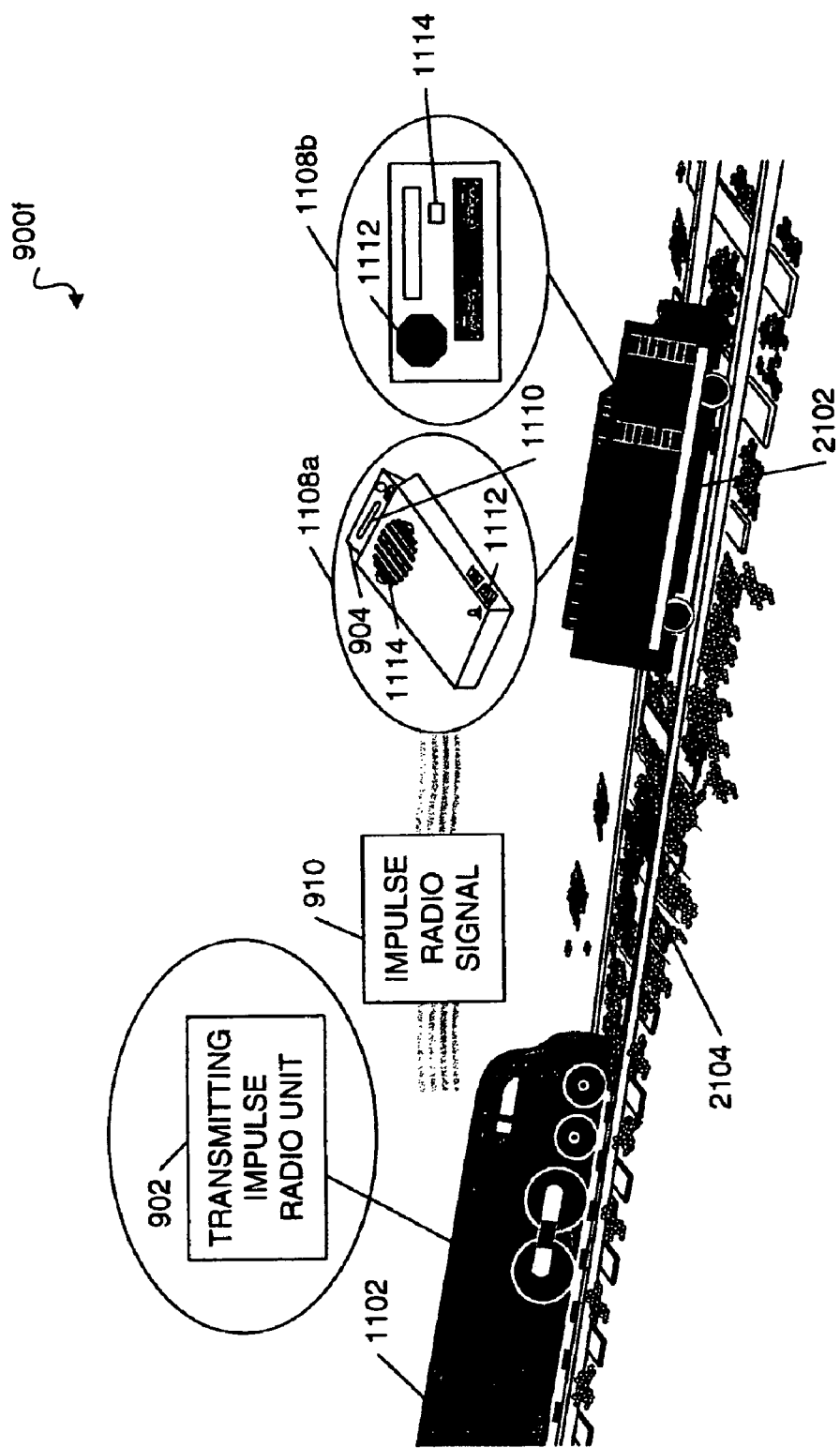
FIG. 21 is a diagram illustrating in greater detail the components of a sixth embodiment of the danger proximity warning system shown in FIG. 9, which is intended to avoid railroad collisions.
Figure 22:
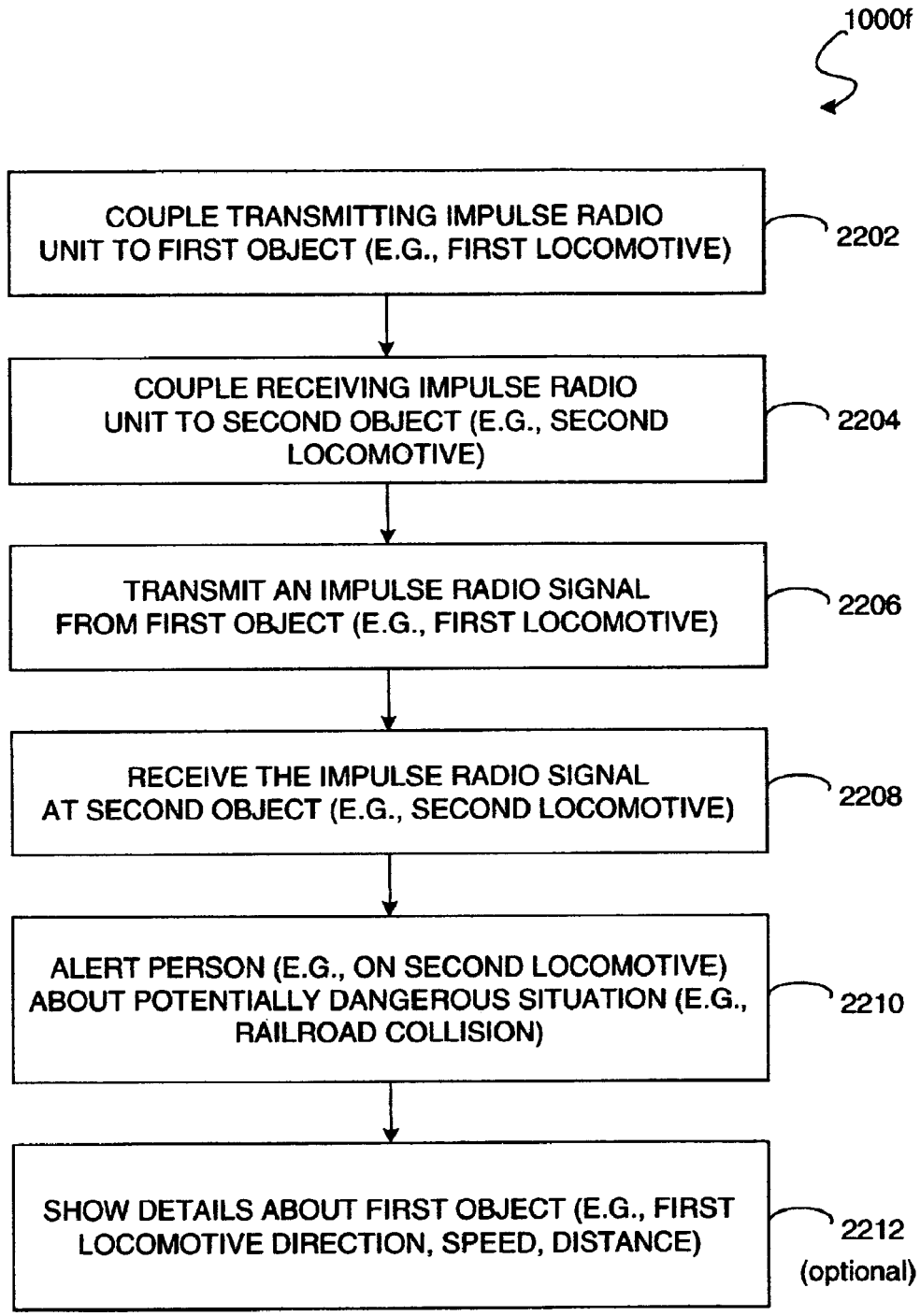
FIG. 22 is a flowchart illustrating in greater detail the steps of a sixth embodiment of the preferred method shown in FIG. 10, which is intended to avoid railroad collisions.

Referring to FIGS. 21 and 22, there are diagrams illustrating in greater detail the components and steps of a sixth embodiment of the danger proximity warning system 900f and method 1000f. In this embodiment, the danger proximity warning system 900f includes a transmitting impulse radio unit 902 coupled (step 2202) to a first object such as a first locomotive 1102 and a receiving impulse radio unit 904 coupled (step 2204) to a second object such as a second locomotive 2102. Since neither of the locomotives 1102 and 2102 would normally be aware of each others presence on the same railroad track 2104, the transmitting impulse radio unit 902 would continually transmit (step 2206) an impulse radio signal 910. As described above, the impulse radio signal 910 has a known pseudorandom sequence of pulses that look like a series of Gaussian waveforms (see FIGS. 1–3).

Upon receiving (step 2206) the impulse radio signal 910 at the second object (e.g., locomotive 2102), the receiving impulse radio unit 904 makes sure that a person (e.g., a person operating the second locomotive 2102) is alerted (step 2208) about the presence of the first object (e.g., first locomotive 1102). For instance, the receiving impulse radio unit 904 may be incorporated within or coupled to an after-market display 1108*a* (showing the receiving impulse radio unit 904) or an in-dash display 1108*b* (not showing the receiving impulse radio unit 904). Either display 1108*a* or 1108*b* is capable of alerting a person of a potentially dangerous situation, such as there being a locomotive 1102 in their vicinity, by generating an alarm (see light 1112) or voice message (see speaker 1114). Moreover, a person could use the display 1108 having a transmitting impulse radio unit (not shown) to communicate with a person on the locomotive 2102 having a receiving impulse radio unit (not shown).

In addition, either display 1108*a* or 1108*b* is capable of showing (step 2210) information about the potentially dangerous situation such as the direction, distance and/or speed of the oncoming first locomotive 1102. To determine the distance that the first object (e.g., first locomotive 1102) is from the second object (e.g., second locomotive 2102), a controller 1110 within the receiving impulse unit 904 can use the revolutionary positioning capabilities of impulse radio technology. In particular, the impulse radio signal 910 transmitted between the transmitting impulse radio unit 902 and the receiving impulse radio unit 904 enables the controller 1110 to measure distances to extremely fine resolution because of the absence of ambiguous cycles in the waveform of the impulse radio signal 910. In contrast, narrow band systems of traditional communication systems are limited to the modulation envelope and cannot easily distinguish precisely which RF cycle is associated with each data bit because the cycle-to-cycle amplitude differences are so small they are masked by link or system noise. Since the waveform of the impulse radio signal 910 does not have multi-cycle ambiguity, this allows the controller 1110 to positively determine the position of the waveform to less than a wavelength even when the waveform is in or near the noise floor of the system. The time position measurement can be used by the controller 1110 to measure the propagation delay and determine the link distance between the receiving impulse radio unit 904 and the locomotive 1102. Once, the distance is known and updated then the speed of the first locomotive 1102 can be determined by the controller 1110.

It should be understood that the first locomotive 1102 can contain the same equipment as the second locomotive 2102 (or other objects 908) and as such could be notified of the presence and speed of an oncoming second locomotive 2102 (or other objects 908).

It should also be understood that the present invention and impulse radio technology could be used in subway (underground) applications the same way it is used in railroad applications. Impulse radio technology is well suited for subway (underground) applications because this technology can effectively transmit and receive impulse radio signals through the ground.

As can be readily appreciated by those skilled in the art, the danger proximity warning system 900 and method 1000 can be used to warn a person about a wide variety of dangerous situations. The exemplary embodiments described above are in the context of a railroad environment where various types of potentially dangerous situations can occur and where an alert given in accordance with the present invention could warn a person about the potentially dangerous situation in an effort to prevent or avoid the danger. Some of the embodiments involve objects that may be mobile (whether moving or not) where one object conveys a warning to the other. Other embodiments involve fixed objects such as traditional warning devices (e.g., flashing lights) that receive a signal that causes them to enter a warning state (e.g., flashing) such that a person may be warned of a potentially dangerous situation. Some of the embodiments involve the use of UWB radar capabilities to detect physical presence of an object within an area that would indicate a potentially dangerous situation (e.g., vehicle stalled on a railroad track). As such, each of the aforementioned embodiments has a common trait in that a warning signal is communicated using UWB communications in order to alert a person of a potentially dangerous situation.

In accordance with the present invention, a warning signal can be conveyed continuously (or periodically) when the danger proximity warning system is placed in an activate state (i.e., turned on). Alternatively, the danger proximity warning system may monitor conditions and convey a warning signal whenever one or more conditions meet established alert status criteria. For example, in an underground mining operation where loud mining equipment is used, mine personnel can be equipped with headsets that provide both ear protection and a UWB communications link to a UWB radio associated with the mining equipment. For instance, a miner could be provided a first type of audio warning whenever mining equipment is operating in the vicinity of the person. And, the miner could be provided another type of audio warning when the miner is determined to be in an area behind mining machinery that is moving backward. Additionally, a different warning signal might be provided if a sensor associated with the danger proximity warning system detected methane gas. More generally, a warning signal may be emitted continuously or periodically when the danger proximity warning system is activate or when one or more conditions being monitored by the danger proximity warning system meet established alert status criteria.

In accordance with the present invention, warning/alert signals may be conveyed using UWB communications between mobile objects, fixed objects, or combinations of mobile and fixed objects in order to warn a person of a potentially dangerous situation. A warning may involve a UWB communications signal conveying an alert status between a first object (e.g. control box) and a second object (e.g., a warning light signal), where the second object then warns a person, or may also involve an additional UWB communications signal between the second object and a third object (e.g., a vehicle) in order to warn the person. Additional communications 'hops' may also be employed.

The signal conveying an alert status may only include enough information to activate or deactivate a warning device, for example, turning on (or off) a warning light or a siren. Alternatively, the signal conveying an alert status may include information describing the potentially dangerous situation, e.g., "ice on bridge 1 mile ahead", which could be conveyed to a person within a vehicle via a visual display and/or an audio device/voice synthesizer. Such additional information may be in accordance with an established protocol and may include system control information such as a warning type identifier or an identifier for the object (or objects) conveying the warning. The signal conveying an alert status may also include information intended to assist the person in assessing and/or avoiding the potentially dangerous situation. Such assistance information may include the location of the potentially dangerous situation, sensor information (e.g., temperature, radiation, etc.), and/or the distance to the dangerous situation, for example, and may include instructions for a suggested or required action to be taken by the person to react to or avoid the potentially dangerous situation (e.g., "merge into left lane" or "Fire alert—Please crawl to the nearest exit".

As described previously in relation to the railroad collision avoidance examples, the danger proximity warning system may involve one or more vehicles. In addition to trains and personal vehicles (i.e., cars, trucks, SUVs, motorcycles, etc.), various other types of vehicles can be involved in the system including: police cars, fire trucks, ambulances, and other emergency personnel vehicles; boats/ships, planes, buses and other mass transit vehicles; mail delivery vehicles, garbage collection vehicles, semi-trucks, and other special purpose commercial vehicles that may be carrying hazardous waste, flammable materials, or explosive cargo; funeral hearses; fork lifts, backhoes, dump trucks, and other industrial vehicles; and tanks, armored personnel carriers, and other military vehicles. Of these different types of vehicles, certain vehicles can be treated as 'potential danger sources'. For example, when emergency vehicles have their emergency lights and sirens on an emergency vehicle warning signal could be conveyed. When such vehicles are moving at emergency speeds, a moving emergency vehicle warning signal could be conveyed. Similarly, a personal vehicle might emit a similar warning signal when moving with its emergency flashers on. Vehicles carrying hazardous waste, flammable materials, or explosive cargo could, for example, transmit an identifying signal warning of the potential dangerous situation as a result of their being present. Generally, most vehicle types could receive warnings of potentially dangerous situations including those warning signals being conveyed by other vehicles. As such, a person driving a vehicle could take extra precautions when proceeding through an intersection when warned that an emergency vehicle is in close proximity or could keep a safe distance from a nearby vehicle when warned it is transporting hazardous cargo.

The danger proximity warning system of the present invention can also involve an UWB-enabled device that is carried on or by a person. An exemplary UWB-enabled device includes a watch, phone, helmet, or computing device. The UWB-enabled device can receive warnings from UWB radios associated with vehicles such as described previously in relation to the mining equipment example. The UWB-enabled device can also enable warnings to be conveyed directly between people. For example, workers in an industrial facility might be equipped with UWB-enabled devices that allow communications with each other and which are interfaced with sensors located on the workers' clothing. If an industrial accident occurs involving hazardous gases, for example, sensors on a worker could detect the gases and send warning messages directly to other workers. The UWB-enabled device can also be used to provide warnings of the presence of potentially dangerous people. For example, a person convicted of sex crimes could be required to wear a UWB transmitter that provides a warning when they are within a restricted distance (e.g. 500 feet) of a school. Similarly, a prisoner or person under house arrest might be required to wear a UWB transmitter that outputs warning signals when the prisoner or person under house arrest is determined to be outside of their confinement area. Such signals could be received by vehicles (in particular police vehicles) or persons equipped with UWB devices, such as a police officers or correctional officers who might be on foot, or on a bike, horseback, or motorcycle.

The danger proximity warning system of the present invention can also use UWB-enabled devices that are installed as part of the infrastructure of buildings and facilities including homes, businesses, industrial plants, schools, churches, hospitals, airports, subways, malls, grocery stores, etc. Such UWB-enabled devices, which might be installed on walls, in ceilings, on poles, above doors, etc., could provide warnings to persons within the building (or facility) using some visual or auditory method such as a warning light, alarm, or synthesized voice message and alternatively could convey a warning by communicating with UWB devices carried by a person. For example, a smoke alarm equipped with a UWB transmitter can convey that it has detected smoke to UWB-enabled warning devices located throughout a building that would provide a warning of the potentially dangerous situation to persons in the building and could provide instructions on the safest route to take to vacate the building. Such UWB-enabled devices might also be used to distribute a warning directly to persons via their UWB-enabled phone or other such device that they carry. Similar warnings may be used to convey that there has been a bomb threat or any other reason to evacuate a building. Such UWB-enabled devices in homes or businesses could communicate with UWB-enabled devices in nearby vehicles to warn a person of a potentially dangerous situation such as an intruder being in a home or there being a gas leak or toxic fumes present (e.g., carbon monoxide). Such UWB-enabled devices could communicate between buildings to convey a warning message such as a warning message from a security guard at the entrance of a gated community sending a message to homes in the community warning of a detected intruder. Or, the UWB-enabled devices could communicate a message from a first building to a second building concerning a hazardous situation in one of the buildings, for example, a gas leak or fire. As such, UWB-enabled devices installed into the infrastructure of a building or facility can transmit and/or receive messages with each other, with UWB devices in vehicles, and UWB devices carried by people in order to convey a warning of a potentially dangerous situation.

In addition, the danger proximity warning system of the present invention can involve UWB-enabled devices that are installed in locations other than vehicles, on persons, or in a building's infrastructure. For instance, UWB-enabled devices can be interfaced with signs, traffic barrels, traffic cones, fences, street light poles, etc. Such UWB-enabled devices could convey warnings to persons in vehicles, directly to persons, or to persons in nearby buildings, and can communicate with each other to convey a warning message. For example, a traffic cone that includes a UWB-enabled device might be placed near a partially flooded roadway. The UWB-enabled device could emit a signal that could be received by nearby vehicles that warned of the potentially dangerous situation. Similarly, a traffic cone might be used in a grocery store to warn shoppers of a slippery floor where the warning signal could be conveyed to a device on the person or to a UWB-enabled device located in a shopping cart being used by the person. In yet another example, a UWB-enabled device co-located with a gas meter could provide a warning of a gas leak. As such, UWB-enabled devices installed in locations other than vehicles, on persons, or in a building's infrastructure can communicate with each other or with UWB devices located in vehicles, on persons, or in a building's infrastructure to convey a warning to a person of a potentially dangerous situation.

Furthermore, a news bulletin service, weather service, or other such service that can provide warning information can be interfaced with a UWB-enabled device in a vehicle, on a person, in a building infrastructure or elsewhere so as to convey warning information to a person. Such services might warn of an approaching severe thunderstorm, tornado, hurricane, forest fire, tsunami, or flash flood conditions. Similarly, homeland defense warnings, amber alerts, and the like can be conveyed in a similar fashion in accordance with the present invention.

Below is a list of exemplary warnings that can be provided to a person in accordance with the present invention:
"Stopped School Bus 500 feet ahead!"
"Right lane closed one quarter mile ahead"
"Caution: Icy Bridge Ahead"
"Fast approaching police vehicle—800 feet to rear."
"Shallow water—idle speed only"
"Underwater hazard ahead 300 feet"
"Slow moving vehicle ahead"
"Funeral procession approaching"
"Train approaching."
"Hazardous chemical spill ahead. Do not approach."
"Evacuate Building Immediately"
"Detour—Bridge out ahead."
"Shallow water."
"Vehicle entering roadway from blind entrance 400 feet ahead."
"Stalled vehicle ahead."
"Stopped school bus ahead."
"Unsafe radiation detected."
"Unauthorized intruder detected."
"Caution: Slippery Floor."
"Track damaged ahead."

Figure 23:
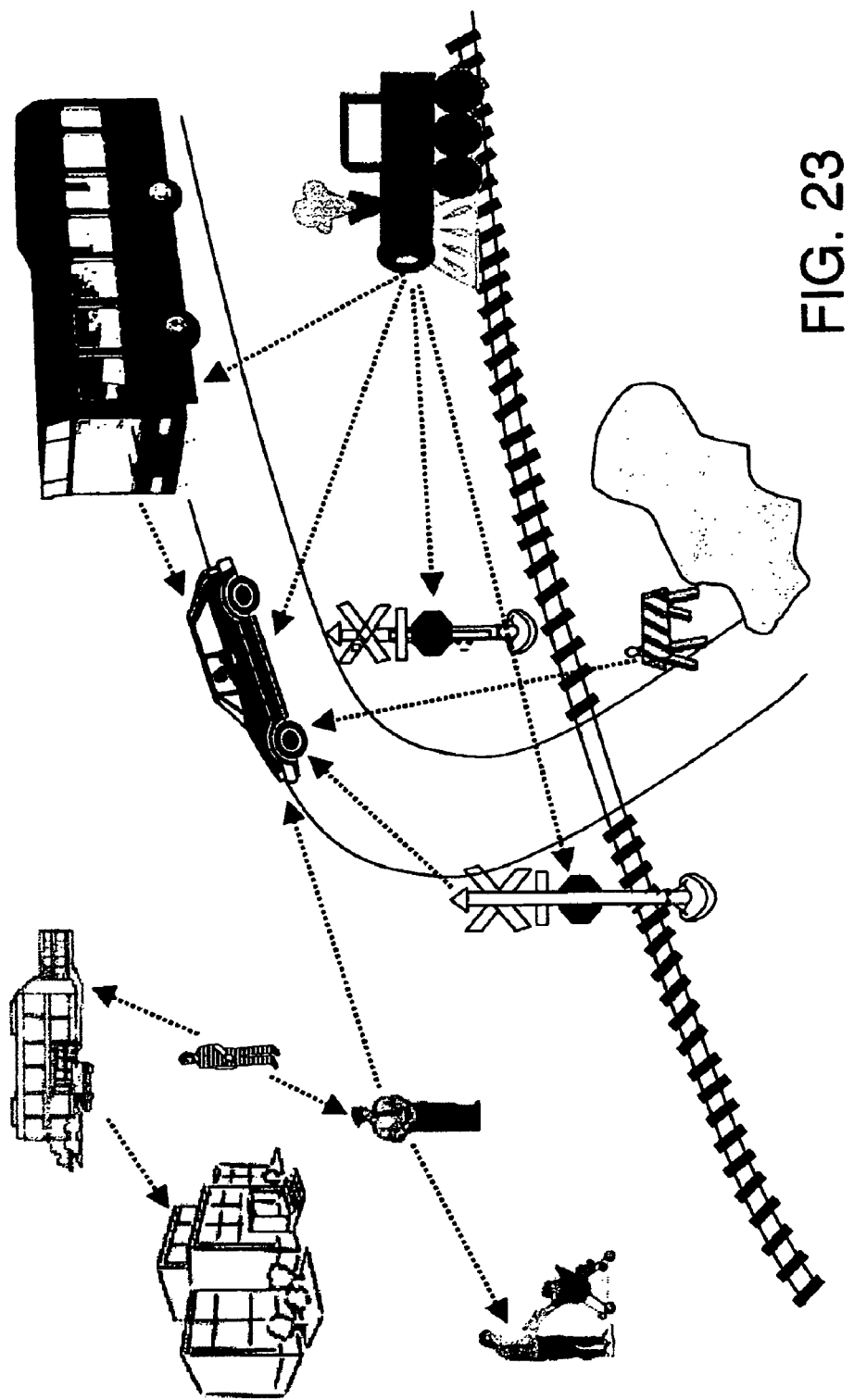
FIG. 23 is an illustration depicting UWB devices conveying warnings to persons in accordance with another embodiment of the danger proximity warning system.

FIG. 23 illustrates various types of warnings of potentially dangerous situations that can be conveyed from the danger proximity warning system to persons in accordance with the present invention. Each of the vehicles, poles, people, etc. shown have associated with them a UWB-enabled radio. In one scenario shown, a train approaching a railroad crossing communicates to the two vehicles (i.e., car and bus) approaching the crossing. The train also communicates with the crossing warning signs. The bus as shown can also warn the car of its close proximity. The car is also warned of water being on the road ahead. In another scenario shown, an escaped criminal carrying an UWB-enabled device is detected being near a school building and warning messages are sent to the school and to a nearby policeman. The policeman warns the approaching car and a nearby woman and her child. And, the school warns a nearby office building. Of course, there are many other possible scenarios in which the danger proximity system of the present invention can be used to warn people of dangerous situations.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A warning system comprising:
   a first ultra wideband (UWB) radio associated with a first object, said first UWB radio transmitting an UWB signal conveying information about a potentially dangerous situation; and
   a second UWB radio associated with a second object, said second UWB radio receiving said UWB signal and alerting a person about the potentially dangerous situation.

2. The warning system of claim 1, wherein the person is alerted when the first object is within a predetermined distance of the second object.

3. The warning system of claim 1, wherein the person is alerted when one of the first object or the second object is determined to be within a predefined area.

4. The warning system of claim 1, wherein at least one of said first object or said second object comprises a vehicle.

5. The warning system of claim 4, wherein said vehicle comprises one of a car, a truck, a SUV, a motorcycle, a police car, an ambulance, a fire truck, an emergency personnel vehicle, a boat, a plane, a bus, a train, a mass transit vehicle, a mail delivery vehicle, a garbage collection vehicle, a semi-truck, a special purpose commercial vehicle, a funeral hearse, a fork lift, a backhoe, a dump truck, an industrial vehicle, a tank, an armored personnel carrier, or a military vehicle.

6. The warning system of claim 4, wherein said vehicle is transporting one of hazardous waste, explosive cargo, or flammable material.

7. The warning system of claim 1, wherein at least one of said first object or said second object comprises one of a phone, watch, helmet, or computing device.

8. The warning system of claim 1, wherein said first object comprises a sensor.

9. The warning system of claim 1, wherein at least one of said first object or said second object is installed in the infrastructure of one of a building, facility, home, business, industrial plant, school, church, hospital, airport, subway, mall, or grocery store.

10. The warning system of claim 1, wherein at least one of said first object or said second object is at least one of a sign, traffic barrel, traffic cone, fence, or street light pole.

11. A method for warning a person of a potentially dangerous situation, said method comprising the steps of:
    associating a first ultra wideband (UWB) radio with a first object;
    associating a second UWB radio with a second object;
    transmitting from said first UWB radio an UWB signal conveying information about said potentially dangerous situation; and
    receiving said UWB signal at said second UWB radio; and
    alerting said person about the potentially dangerous situation.

12. The method of claim 11, wherein the person is alerted when the first object is within a predetermined distance of the second object.

13. The method of claim 11, wherein the person is alerted when one of the first object or the second object is determined to be within a predefined area.

14. The method of claim 11, wherein at least one of said first object or said second object comprises a vehicle.

15. The method of claim 14, wherein said vehicle comprises one of a car, a truck, a SUV, a motorcycle, a police car, an ambulance, a fire truck, an emergency personnel vehicle, a boat, a plane, a bus, a train, a mass transit vehicle, a mail delivery vehicle, a garbage collection vehicle, a semi-truck, a special purpose commercial vehicle, a funeral hearse, a fork lift, a backhoe, a dump truck, an industrial vehicle, a tank, an armored personnel carrier, or a military vehicle.

16. The method of claim 14, wherein said vehicle is transporting one of hazardous waste, explosive cargo, or flammable material.

17. The method of claim 11, wherein at least one of said first object or said second object comprises one of a phone, watch, helmet, or computing device.

18. The method of claim 11, wherein said first object comprises a sensor.

19. The method of claim 11, wherein at least one of said first object or said second object is installed in the infrastructure of one of a building, facility, home, business, industrial plant, school, church, hospital, airport, subway, mall, or grocery store.

20. The method of claim 11, wherein at least one of said first object or said second object is at least one of a sign, traffic barrel, traffic cone, fence, or street light pole.

* * * * *